US012707092B2

(12) United States Patent
Wang

(10) Patent No.: US 12,707,092 B2
(45) Date of Patent: Aug. 11, 2026

(54) AVOIDANCE OF REDUNDANT SIGNALING IN MULTI-LAYER VIDEO BITSTREAMS

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/791,524

(22) Filed: Aug. 1, 2024

(65) Prior Publication Data

US 2024/0397109 A1 Nov. 28, 2024

Related U.S. Application Data

(60) Division of application No. 17/713,991, filed on Apr. 5, 2022, now Pat. No. 12,096,034, which is a (Continued)

(51) Int. Cl.
*H04N 19/00* (2014.01)
*H04N 19/105* (2014.01)
(Continued)

(52) U.S. Cl.
CPC ........... *H04N 19/70* (2014.11); *H04N 19/105* (2014.11); *H04N 19/136* (2014.11); (Continued)

(58) Field of Classification Search
None
See application file for complete search history.

(56) References Cited

U.S. PATENT DOCUMENTS 8,693,549 B2 4/2014 Choi et al.
9,432,664 B2 8/2016 Wang
(Continued)

FOREIGN PATENT DOCUMENTS

CN 104641648 A 5/2015
CN 104662914 A 5/2015
CN 105075262 A 11/2015
CN 105519119 A 4/2016
CN 105556975 A 5/2016
CN 105637878 A 6/2016
CN 105637883 A 6/2016
(Continued)

OTHER PUBLICATIONS

"Line Transmission of Non-Telephone Signals Video Codec for Audiovisual Services At px64 kbits," ITU-T Recommendation H.261, Mar. 1993, 29 pages.
(Continued)

*Primary Examiner* — Zhihan Zhou
(74) *Attorney, Agent, or Firm* — Conley Rose, P.C.

(57) ABSTRACT

A method of decoding is provided. The method includes receiving a sub-bitstream having a sequence parameter set (SPS) with a profile tier level (PTL) syntax structure for an output layer set (OLS) with only one layer; setting a number of layers in the OLS equal to one based on the OLS having the only one layer; obtaining the PTL syntax structure for the OLS with the only one layer from the SPS when the number of layers in the OLS has been set equal to one; and decoding a picture from the only one layer using the PTL syntax structure to obtain a decoded picture. A corresponding method of encoding is also provided.

20 Claims, 11 Drawing Sheets

Related U.S. Application Data continuation of application No. PCT/US2020/054449, filed on Oct. 6, 2020.

(60) Provisional application No. 62/911,808, filed on Oct. 7, 2019.

(51) Int. Cl.

| | |
|---|---|
| ***H04N 19/136*** | (2014.01) |
| ***H04N 19/159*** | (2014.01) |
| ***H04N 19/169*** | (2014.01) |
| ***H04N 19/172*** | (2014.01) |
| ***H04N 19/174*** | (2014.01) |
| ***H04N 19/187*** | (2014.01) |
| ***H04N 19/30*** | (2014.01) |
| ***H04N 19/423*** | (2014.01) |
| ***H04N 19/46*** | (2014.01) |
| ***H04N 19/463*** | (2014.01) |
| ***H04N 19/50*** | (2014.01) |
| ***H04N 19/593*** | (2014.01) |
| ***H04N 19/70*** | (2014.01) |

(52) U.S. Cl.

CPC ......... *H04N 19/159* (2014.11); *H04N 19/172* (2014.11); *H04N 19/174* (2014.11); *H04N 19/187* (2014.11); *H04N 19/188* (2014.11); *H04N 19/30* (2014.11); *H04N 19/423* (2014.11); *H04N 19/46* (2014.11); *H04N 19/463* (2014.11); *H04N 19/50* (2014.11); *H04N 19/593* (2014.11)

(56) References Cited

U.S. PATENT DOCUMENTS

| | | | | |
|---|---|---|---|---|
| 9,628,792 | B2 | 4/2017 | Rapaka et al. | |
| 9,699,480 | B2 | 7/2017 | Deshpande | |
| 9,712,871 | B2 | 7/2017 | Ramasubramonian et al. | |
| 9,819,948 | B2 | 11/2017 | Wang | |
| 9,918,091 | B2 | 3/2018 | Wang et al. | |
| 9,942,545 | B2 | 4/2018 | Kwon et al. | |
| 9,992,493 | B2 | 6/2018 | Chen et al. | |
| 10,404,990 | B2 | 9/2019 | Hendry et al. | |
| 10,432,951 | B2 | 10/2019 | Wang | |
| 2009/0010332 | A1 | 1/2009 | Jeon et al. | |
| 2012/0230431 | A1 | 9/2012 | Boyce et al. | |
| 2013/0077681 | A1 | 3/2013 | Chen et al. | |
| 2014/0003491 | A1 | 1/2014 | Chen et al. | |
| 2014/0086303 | A1 | 3/2014 | Wang | |
| 2014/0086331 | A1 | 3/2014 | Wang | |
| 2014/0086333 | A1 | 3/2014 | Wang | |
| 2014/0086336 | A1 | 3/2014 | Wang | |
| 2014/0092955 | A1 | 4/2014 | Wang | |
| 2014/0092996 | A1 | 4/2014 | Wang | |
| 2014/0185691 | A1 | 7/2014 | Kwon et al. | |
| 2014/0218473 | A1 | 8/2014 | Hannuksela et al. | |
| 2014/0294062 | A1 | 10/2014 | Chen et al. | |
| 2014/0301441 | A1 | 10/2014 | Wang et al. | |
| 2014/0301477 | A1 | 10/2014 | Deshpande | |
| 2014/0301484 | A1* | 10/2014 | Wang .................... | H04N 19/30 375/240.26 |
| 2014/0355692 | A1 | 12/2014 | Ramasubramonian et al. | |
| 2015/0016545 | A1 | 1/2015 | Ramasubramonian et al. | |
| 2015/0103884 | A1 | 4/2015 | Ramasubramonian et al. | |
| 2015/0103886 | A1 | 4/2015 | He et al. | |
| 2015/0103928 | A1 | 4/2015 | Seregin et al. | |
| 2015/0189322 | A1 | 7/2015 | He et al. | |
| 2015/0195528 | A1 | 7/2015 | Wang | |
| 2015/0264366 | A1 | 9/2015 | Hendry et al. | |
| 2015/0271526 | A1 | 9/2015 | Hendry et al. | |
| 2015/0304666 | A1 | 10/2015 | Seregin et al. | |
| 2015/0319448 | A1 | 11/2015 | Ramasubramonian et al. | |
| 2015/0334407 | A1 | 11/2015 | Rusert | |
| 2015/0365701 | A1 | 12/2015 | Le Pendu | |
| 2015/0365702 | A1* | 12/2015 | Deshpande ............ | H04N 19/30 375/240.25 |
| 2015/0373333 | A1 | 12/2015 | Wang et al. | |
| 2015/0373343 | A1 | 12/2015 | Hendry et al. | |
| 2015/0373346 | A1* | 12/2015 | Wang .................. | H04N 19/188 375/240.02 |
| 2015/0373347 | A1 | 12/2015 | Wang | |
| 2015/0373361 | A1* | 12/2015 | Wang ..................... | H04N 19/70 375/240.16 |
| 2016/0044324 | A1 | 2/2016 | Deshpande | |
| 2016/0044330 | A1 | 2/2016 | Choi et al. | |
| 2016/0057430 | A1 | 2/2016 | Kolesnikov et al. | |
| 2016/0112724 | A1 | 4/2016 | Hendry et al. | |
| 2016/0119632 | A1 | 4/2016 | Lee et al. | |
| 2016/0173887 | A1 | 6/2016 | Deshpande | |
| 2016/0191926 | A1 | 6/2016 | Deshpande | |
| 2016/0249056 | A1 | 8/2016 | Tsukuba et al. | |
| 2016/0255373 | A1 | 9/2016 | Deshpande | |
| 2016/0261878 | A1 | 9/2016 | Deshpande | |
| 2016/0301895 | A1 | 10/2016 | Lu et al. | |
| 2016/0316227 | A1 | 10/2016 | Wang | |
| 2016/0366428 | A1* | 12/2016 | Deshpande ............ | H04N 19/30 |
| 2017/0006300 | A1* | 1/2017 | Tsukuba ................ | H04N 19/36 |
| 2017/0019673 | A1* | 1/2017 | Tsukuba ................ | H04N 19/30 |
| 2017/0026655 | A1 | 1/2017 | Deshpande | |
| 2017/0134742 | A1 | 5/2017 | Deshpande | |
| 2017/0150160 | A1 | 5/2017 | Deshpande | |
| 2018/0167637 | A1 | 6/2018 | Yin et al. | |
| 2019/0052910 | A1 | 2/2019 | Deshpande | |
| 2019/0058895 | A1 | 2/2019 | Deshpande | |
| 2021/0092426 | A1* | 3/2021 | Choi ..................... | H04N 19/70 |
| 2021/0092451 | A1* | 3/2021 | Choi ..................... | H04N 19/70 |
| 2022/0109848 | A1 | 4/2022 | Wang | |
| 2022/0109861 | A1 | 4/2022 | Hannuksela et al. | |
| 2022/0109865 | A1 | 4/2022 | Deshpande | |
| 2022/0232256 | A1 | 7/2022 | Wang | |
| 2022/0345745 | A1 | 10/2022 | Deshpande | |
| 2023/0085717 | A1 | 3/2023 | Wang | |
| 2023/0156230 | A1 | 5/2023 | Hendry | |

FOREIGN PATENT DOCUMENTS

| | | | |
|---|---|---|---|
| CN | 105706451 | A | 6/2016 |
| CN | 106105217 | A | 11/2016 |
| CN | 107852511 | A | 3/2018 |
| JP | 2015529439 | A | 10/2015 |
| JP | 2015195543 | A | 11/2015 |
| JP | 2016518041 | A | 6/2016 |
| JP | 2016518759 | A | 6/2016 |
| JP | 2016518763 | A | 6/2016 |
| JP | 2016528806 | A | 9/2016 |
| JP | 2016530734 | A | 9/2016 |
| JP | 2016539537 | A | 12/2016 |
| JP | 2016539545 | A | 12/2016 |
| JP | 2017508417 | A | 3/2017 |
| JP | 2017522792 | A | 8/2017 |
| JP | 2017523683 | A | 8/2017 |
| JP | 2018507622 | A | 3/2018 |
| JP | 7612825 | B2 | 1/2025 |
| RU | 2612577 | C2 | 3/2017 |
| RU | 2649297 | C2 | 3/2018 |
| RU | 2653299 | C2 | 5/2018 |
| RU | 2656827 | C2 | 6/2018 |
| WO | 2013162450 | A1 | 10/2013 |
| WO | 2014047613 | A1 | 3/2014 |
| WO | 2015053330 | A | 4/2015 |
| WO | 2015196034 | A1 | 12/2015 |
| WO | 2021057869 | A1 | 4/2021 |
| WO | 2021235327 | A1 | 11/2021 |

OTHER PUBLICATIONS

"Transmission of Non-Telephone Signals; Information Technology—Generic Coding of Moving Pictures and Associated Audio Information: Video," ITU-T Recommendation H.262, Jul. 1995, 211 pages.

(56) References Cited

OTHER PUBLICATIONS

"Series H: Audiovisual and Multimedia Systems; Infrastructure of audiovisual services—Coding of moving video; Video coding for low bit rate communication," ITU-T Recommendation H.263, Jan. 2005, 226 pages.
"Series H: Audiovisual and Multimedia Systems; Infrastructure of audiovisual services—Coding of moving video; Advanced video coding for generic audiovisual services," Recommendation ITU-T H.264, Jun. 2019, 836 pages.
"Series H: Audiovisual and Multimedia Systems; Infrastructure of audiovisual services—Coding of moving video; High efficiency video coding" Recommendation ITU-T H.265, Apr. 2013, 317 pages.
Bross, B., et al., "Versatile Video Coding (Draft 6)," Document: JVET-O2001-vE, Joint Video Experts Team (JVET) of ITU-T SG 16 WP3 and ISO/IEC JTC 1/SC 29/WG 11 15th Meeting: Gothenburg, SE, Jul. 3-12, 2019, 455 pages.
Wang, Y.K., "AHG8: Scalability—output layer sets," Document: JVET-P0115-v1, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Wang, Y.K., "AHG8: Scalability—random access," Document: JVET-P0116-v1, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-P0117-v1, Wang, Y., "AHG8: Scalability—PTL and decoder capability," Joint Video Experts Team (JVET) of ITU-Y SG 16 WP 3 and ISO/IEC JTC 1/SC 29/WG 11 16th Meeting: Geneva, CH, Oct. 1-11, 2019, 7 pages.
Wang, Y.K., "AHG8: Scalability—HRD," Document: JVET-P0118-v3, Joint Video Experts Team (JVET) of ITU-T SG 16 WP 3 and ISO/IEC JTC 1/SC 29/WG 11 16th Meeting: Geneva, CH, Oct. 1-11, 2019, 11 pages.
Wang, Y.K., "AHG8/AHG17: Miscellaneous HLS topics," Document: JVET-P0125-v1, Joint Video Experts Team (JVET) of ITU-T SG 16 WP 3 and ISO/IEC JTC 1/SC 29/WG 11 16th Meeting: Geneva, CH, Oct. 1-11, 2019, 3 pages.0.
Wang, Y.K., "AHG8/AHG17: On buffering period, picture timing, and decoding unit information SEI messages," Document: JVET-P0189-v1, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Wang, Y.K., "AHG8/AHG17: Scalable nesting SEI message," Document: JVET-P0190-v1, Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Sjoberg, R., et al., "Overview of HEVC High-Level Syntax and Reference Picture Management," IEEE Transactions on Circuits and Systems for Video Technology, vol. 22, No. 12, Dec. 2012, 13 pages.
Document: JCTVC-M0209, Wg 11 No. m28663, Deshpande, S., "On Design for Signaling Inter-layer Prediction," Joint Collaborative Team on Video Coding (JCT-VC) of ITU-T SG16 WP3 and ISO/IEC JTC1/ SC29/ WG11, 13th Meeting: Incheon, KR, Apr. 18-26, 2013, 6 pages, XP030114166.
Document: JVET-R2001-vA, Bross, B., et al., "Versatile Video Coding (Draft 9)," Joint Video Experts Team (JVET) of ITU-T SG 16 WP 3 and ISO/IEC JTC I/SC 29/WG 11, 18th Meeting: by teleconference, Apr. 15-24, 2020, 526 pages, XP030288322.
Document: JCTVC-Q0154, Ramasubramonian, A., et al., "MV-HEVC/SHVC HLS: On picture flushing and DPB parameters," Joint Collaborative Team on Video Coding (JCT-VC) of ITU-T SG 16 WP 3 and ISO/IEC JTC 1/SC 29/ WG11, 17th Meeting: Valencia, ES, Mar. 27-Apr. 4, 2014, 13 pages, XP030132094.
Document: JVET-R0193-r1, Hendry et al., "AHG8/AHG9: On signalling of syntax element max_tid_il_ref_pics_plusl," Joint Video Experts Team (JVET) of ITU-T SG 16 WP 3 and ISO/IEC JTC 1/SC 29/WG11, 18th Meeting: by teleconference, Apr. 15-24, 2020, 6 pages, XP030286144.
Document: JVET-P0097, Hannuksela, M, "AHG8/AHG17: Removing dependencies on VPS from the decoding process of a non-scalable bitstream," Joint Video Experts Team (JVET) of ITU-T SG 16 WP 3 and ISO/IEC JTC 1/SC 29/WG11, 16th Meeting: Geneva, CH, Oct. 1-11, 2019, 5 pages, XP030205943.
Dong, L., et al., "Implementation of HEVC Network Abstraction Layer Unit Based on FPGA," Electrical Switches (2019. No. 2), 2019, with an English Abstract, 4 pages.
Yan, Z., et al., "Flexible prediction structure for multi-view video coding," Journal of Image and Graphics, vol. 17, No., 6, Jun. 2012, with an English Abstract, 6 pages.
Xu, T., et al., "A video stitching method based on compressed domain," Video engineering, 2017, 41(11/12), with an English Abstract, 6 pages.
Document: JVET-P0117-v2, Wang, Y., "AHG8: Scalability—PTL and decoder capability," Joint Video Experts Team (JVET) of ITU-T SG 16 WP 3 and ISO/IEC JTC 1/SC 29/WG11, 16th Meeting: Geneva, CH, Oct. 1-11, 2019, 4 pages, XP030216291.
Document: JVET-P2001-v9, Bross, B., et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, 495 pages.
Document: JVET-Q0197-v1, Wang, B., et al., "Miscellaneous fixes for HLS in Specification," Joint Video Experts Team (JVET) of ITU-T SG 16 WP 3 and 1S0/IEC JTC 1/SC 29/WG11, 17th Meeting: Brussels, BE, Jan. 7-17, 2020, 2 pages, XP030222871.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG11, 16th Meeting: Geneva, CH, Oct. 1-11, 2019, 491 pages, XP030218455.
Document: JCTVC-M0450_v3, Wang, Y., "Report of the joint BoG on high-level syntax," Joint Collaborative Team on Video Coding (JCT-VC) of ITU-T SG 16 WP 3 and ISO/IECJTC 1/SC 29/WG11, 13th Meeting: Incheon, KR, Apr. 18-26, 2013, 27 pages, XP030237563.
Document: JVET-O0148-v1, Wang, Y., et al., "AHG17: On reference picture list signalling," Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-6.
Document: JVET-P0205, Drugeon, V., et al., "AHG17: Presence of Video Parameter Set in bitstreams," Joint Video Experts Team (JVET) of ITU-Y SG 16 WP 3 and ISO/IEC JTC 1/SC 29/WG 11 16th Meeting: Geneva, CH, Oct. 1-11, 2019, 7 pages.
Document: JVET-P0185-v1, Deshpande, S., "On Video Parameter Set and Highest Temporal Sub-layer," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JCTVC-O0260, Misra, K., et al., "Inter Predictions Signalling and Picture Marking," Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, 5 pages.
Document: JVET-S0152-v6, Wang, Y.K., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.
Chen et al."Overview of HEVC High-Level Syntax and Reference Picture Management" In:IEEE Transactions on Circuits and Systems for Video Technology?Dec. 2012,(online)retrieved on Dec. 10, 2020(Dec. 10, 2020), total 14 pages.
B.Bross,et al.,"Versatile Video Coding (Draft 5)",Joint Video Experts Team (JVET) of ITU-T SG 16 WP 3 and ISO/IEC JTC 1/SC 29/WG 11 14th Meeting:Geneva,CH,Mar. 19-27, 2019,JVET-N1001 ,total 407 pages.
Tsui-Shan Chang,et al.,"Non-CE1:WD of enabling TMVP in RPR",(JVET) of ITU-T SG 16 WP 3 and ISO/IEC JTC 1/ SC 29/WG 11 16th Meeting:Geneva,CH,Oct. 1-11, 2019,JVET-P0274WD total 445 pages.
Ye-Kui Wang,"AHG8: Scalability-PTL and decoder capability", Video Experts Team (JVET) of ITU-T SG 16 WP 3 and ISO/IEC JTC 1/SC 29/WG 11 16th Meeting:Geneva,CH,Oct. 1-11, 2019,JVET-P0117-v1,total 4 pages.

(56) References Cited

OTHER PUBLICATIONS

Sachin Deshpande,"On Video Parameter Set and Highest Temporal Sub-layer",(JVET) of ITU-T SG 16 WP 3 and ISO/IEC JTC 1/SC 29/WG 11 16th Meeting:Geneva,CH,Oct. 1-11, 2019,JVET-P0185, total 11 pages.
Document: JVET-N1001-v3, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 371 pages.
"Series T: Terminals for Telematic Services Procedure for the allocation of ITU-T defined codes for non-standard facilities," ITU-T Recommendation T.35, Feb. 2000, 15 pages.
Document: JVET-P0221-v2, Choi, B., et al., "AHG8: On signaling interlayer reference picture list," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-O0148-v1, Ye-Kui Wang, et al., AHG17: On reference picture list signalling, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.
Document: JVET-O2001-vE; Bross B et al: "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.
Document: JVET-P0097, Hannuksela M M, et al "AHG8/AHG17: Removing dependencies on VPS from the decoding process of a non-scalable bitstream," Joint Video Experts Team (JVET) of ITU-T SG 16 WP 3 and ISO/IEC JTC 1/SC 29/WG 11, 16th Meeting: Geneva, CH, Oct. 1-11, 2019, 5 pages.
Document: JVET-P0117-v2; Y-K Wang, et al."AHG8: Scalability—PTL and decoder capability," Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.
Document: JVET-P0118-v3, Ye-Kui Wang, "AHG8: Scalability—HRD," Joint Video Experts Team (JVET) of ITU-T SG 16 WP 3 and ISO/IEC JTC 1/SC 29/WG 11, 16th Meeting: Geneva, CH, Oct. 1-11, 2019, 3 pages.
Vadim Seregin, AHG8: On inter-layer reference picture index range, Joint Video Experts Team (JVET) of ITU-T SG 16 WP 3 and ISO/IEC JTC 1/SC 29/WG 11, 16th Meeting: Geneva, CH, Oct. 1-11, 2019, JVET-P0589, total 2 pages.

* cited by examiner

AVOIDANCE OF REDUNDANT SIGNALING IN MULTI-LAYER VIDEO BITSTREAMS

CROSS-REFERENCE TO RELATED APPLICATIONS

This is a divisional of U.S. patent application Ser. No. 17/713,991 filed Apr. 5, 2022, which is a continuation of International Application No. PCT/US2020/054449 filed on Oct. 6, 2020, which claims the benefit of U.S. Provisional Patent Application No. 62/911,808 filed Oct. 7, 2019, all of which are hereby incorporated by reference.

TECHNICAL FIELD

In general, this disclosure describes techniques for multi-layer video bitstreams in video coding. More specifically, this disclosure describes techniques for eliminating redundancy when signaling parameters corresponding to layers in a multi-layer bitstream in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder, comprising: receiving, by the video decoder, a sub-bitstream having a sequence parameter set (SPS) with a profile tier level (PTL) syntax structure for an output layer set (OLS) with only one layer; setting, by the video decoder, a number of layers in the OLS equal to one based on the OLS having the only one layer; obtaining, by the video decoder, the PTL syntax structure for the OLS with the one layer from the SPS when the number of layers in the OLS has been set equal to one; and decoding, by the video decoder, a picture from the only one layer using the PTL syntax structure to obtain a decoded picture.

The method provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PTL syntax structure is designated profile_tier_level( ).

Optionally, in any of the preceding aspects, another implementation of the aspect provides that the only one layer is the i-th layer, and wherein the OLS is the i-th OLS.

Optionally, in any of the preceding aspects, another implementation of the aspect provides that the PTL syntax structure is present in an i-th profile_tier_level( ) syntax structure in the SPS.

Optionally, in any of the preceding aspects, another implementation of the aspect provides that the sub-bitstream does not include a video parameter set (VPS).

Optionally, in any of the preceding aspects, another implementation of the aspect provides that the number of layers in the OLS is a variable designated NumLayersInOls [i].

Optionally, in any of the preceding aspects, another implementation of the aspect provides that the SPS is referred to by the only one layer in the OLS.

Optionally, in any of the preceding aspects, another implementation of the aspect provides displaying the decoded picture on a display of an electronic device.

A second aspect relates to a method of encoding implemented by a video encoder, the method comprising: generating, by the video encoder, a video parameter set (VPS) and a sequence parameter set (SPS), wherein the VPS includes a list of profile tier level (PTL) syntax structures for all output layer sets (OLSs), and wherein the SPS includes the PTL syntax structure for each OLS having only one layer; encoding, by the video encoder, the VPS and the SPS into a video bitstream; and storing, by the video encoder, the video bitstream for communication toward a video decoder.

The method provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the VPS includes an index to the list of PTL syntax structures, and wherein the index is designated vps_ols_ptl_idx[i].

Optionally, in any of the preceding aspects, another implementation of the aspect provides that a value of vps_ols_ptl_idx[i] is in a range of zero to a total number of the PTL syntax structures in the VPS.

Optionally, in any of the preceding aspects, another implementation of the aspect provides that the VPS includes vps_num_ptls_minus1, and wherein vps_num_ptls_minus1 plus 1 specifies the total number of the PTL syntax structures in the VPS.

Optionally, in any of the preceding aspects, another implementation of the aspect provides extracting a sub-bitstream from the bitstream, wherein the sub-bitstream includes the SPS from the bitstream but does not include the VPS from the bitstream.

Optionally, in any of the preceding aspects, another implementation of the aspect provides that transmitting the sub-bitstream toward a video decoder.

A third aspect relates to a decoding device, comprising: a receiver configured to receive a sub-bitstream having a sequence parameter set (SPS) with a profile tier level (PTL) syntax structure for an output layer set (OLS) with only one layer; and a processor coupled to the memory, the processor configured to execute the instructions to cause the decoding device to: set a number of layers in the OLS equal to one based on the OLS having the only one layer; obtain the PTL syntax structure for the OLS with the one layer from the SPS when the number of layers in the OLS has been set equal to one; and decode a picture from the only one layer using the PTL syntax structure to obtain a decoded picture.

The decoding device provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the PTL syntax structure is designated profile_tier_level( ) wherein the only one layer is the i-th layer, and wherein the OLS is the i-th OLS.

Optionally, in any of the preceding aspects, another implementation of the aspect provides that the PTL syntax structure is present in an i-th profile_tier_level( ) syntax structure in the SPS.

Optionally, in any of the preceding aspects, another implementation of the aspect provides that the sub-bitstream does not include a video parameter set (VPS).

Optionally, in any of the preceding aspects, another implementation of the aspect provides that the number of layers in the OLS is a variable designated NumLayersInOls[i]; and wherein the SPS is referred to by the only one layer in the OLS.

Optionally, in any of the preceding aspects, another implementation of the aspect provides that a display configured to display the decoded picture.

A fourth aspect relates to an encoding device, comprising: a memory containing instructions; a processor coupled to the memory, the processor configured to implement the instructions to cause the encoding device to: generate a video parameter set (VPS) and a sequence parameter set (SPS), wherein the VPS includes a list of profile tier level (PTL) syntax structures for all output layer sets (OLSs), and wherein the SPS includes the PTL syntax structure for each OLS having only one layer; and encode the VPS and the SPS into a video bitstream; and a transmitter coupled to the processor, the transmitter configured to transmit the video bitstream toward a video decoder.

The encoding device provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the VPS includes an index to the list of PTL syntax structures, and wherein the index is designated vps_ols_ptl_idx[i].

Optionally, in any of the preceding aspects, another implementation of the aspect provides that a value of vps_ols_ptl_idx[i] is in a range of zero to a total number of the PTL syntax structures in the VPS.

Optionally, in any of the preceding aspects, another implementation of the aspect provides that the VPS includes vps_num_ptls_minus1, and wherein vps_num_ptls_minus1 plus 1 specifies the total number of the PTL syntax structures in the VPS.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display a decoded picture.

A sixth aspect relates to a system. The system includes an encoder; and a decoder in communication with the encoder, wherein the encoder or the decoder includes the decoding device, the encoding device, or the coding apparatus disclosed herein.

The system provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
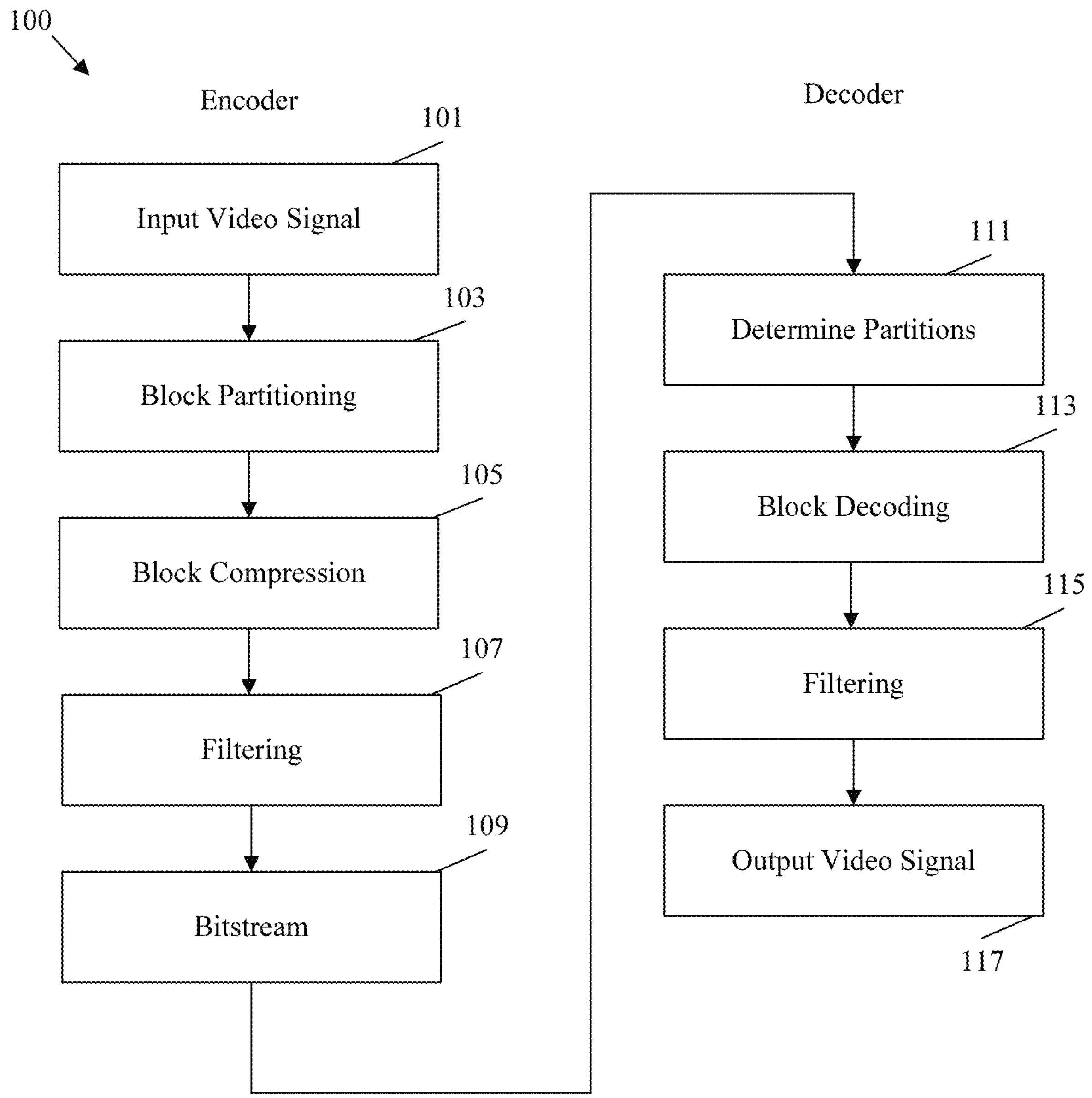
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists.

Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list.

A slice header is a part of a coded slice containing data elements pertaining to all video data within a tile represented in the slice. A picture parameter set (PPS) is a parameter set that contains data related to an entire picture. More specifically, the PPS is a syntax structure containing syntax elements that apply to zero or more entire coded pictures as determined by a syntax element found in each picture header. A sequence parameter set (SPS) is a parameter set that contains data related to a sequence of pictures. An access unit (AU) is a set of one or more coded pictures associated with the same display time (e.g., the same picture order count) for output from a decoded picture buffer (DPB) (e.g., for display to a user). An access unit delimiter (AUD) is an indicator or data structure used to indicate the start of an AU or the boundary between AUs. A decoded video sequence is a sequence of pictures that have been reconstructed by a decoder in preparation for display to a user.

A network abstraction layer (NAL) unit is a syntax structure containing data in the form of a Raw Byte Sequence Payload (RBSP), an indication of the type of data, and interspersed as desired with emulation prevention bytes. A video coding layer (VCL) NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. A layer is a set of VCL NAL units that share a specified characteristic (e.g., a common resolution, frame rate, image size, etc.) and associated non-VCL NAL units. The VCL NAL units of a layer may share a particular value of a NAL unit header layer identifier (nuh_layer_id). A coded picture is a coded representation of a picture comprising VCL NAL units with a particular value of a NAL unit header layer identifier (nuh_layer_id) within an access unit (AU) and containing all coding tree units (CTUs) of the picture. A decoded picture is a picture produced by applying a decoding process to a coded picture.

An output layer set (OLS) is a set of layers for which one or more layers are specified as output layer(s). An output layer is a layer that is designated for output (e.g., to a display). A zeroth (0-th) OLS is an OLS that contains only a lowest layer (layer with a lowest layer identifier) and hence contains only an output layer. The number of layers in an OLS may be designated by a syntax element designated NumLayersInOLS. A video parameter set (VPS) is a data unit that contains parameters related to an entire video. Inter-layer prediction is a mechanism of coding a current picture in a current layer by reference to a reference picture in a reference layer, where the current picture and the reference picture are included in the same AU and the reference layer includes a lower nuh_layer_id than the current layer.

A profile is a defined set of coding tools used to create a compliant or conforming bitstream. Each profile specifies a subset of algorithmic features and limits that shall be supported by all decoders conforming to that profile. Tiers and levels are constraints that define a bitstream in terms of maximum bit rate, maximum luma sample rate, maximum luma picture size, minimum compression ratio, maximum number of slices allowed, and maximum number of tiles allowed. Lower tiers are more constrained than higher tiers and lower levels are more constrained than higher levels. Profile, tier, and level (PTL) parameters are a syntax structure that provides profile, tier, and/or level information.

A temporal scalable bitstream is a bitstream coded in multiple layers providing varying temporal resolution/frame rate (e.g., each layer is coded to support a different frame rate). A sublayer is a temporal scalable layer of a temporal scalable bitstream including VCL NAL units with a particular temporal identifier value and associated non-VCL NAL units. For example, a temporal sublayer is a layer that contains video data associated with a specified frame rate. A sublayer representation is a subset of the bitstream containing NAL units of a particular sublayer and the lower sublayers. Hence, one or more temporal sublayers may be combined to achieve a sublayer representation that can be decoded to result in a video sequence with a specified frame rate. An OLS index is an index that uniquely identifies a corresponding OLS. A temporal identifier (ID) is a data element that indicates data corresponds to temporal location in a video sequence. A sub-bitstream extraction process is a process that removes NAL units from a bitstream that do not belong to a target set as determined by a target OLS index and a target highest temporal ID. The sub-bitstream extraction process results in an output sub-bitstream containing NAL units from the bitstream that are part of the target set.

An HRD is a decoder model operating on an encoder that checks the variability of bitstreams produced by an encoding process to verify conformance with specified constraints. A bitstream conformance test is a test to determine whether an encoded bitstream complies with a standard, such as Versatile Video Coding (VVC). HRD parameters are syntax elements that initialize and/or define operational conditions of an HRD. Sequence-level HRD parameters are HRD parameters that apply to an entire coded video sequence. A maximum HRD temporal ID (hrd_max_tid[i]) specifies the temporal ID of the highest sublayer representation for which the HRD parameters are contained in an i-th set of OLS HRD parameters. A general HRD parameters (general_hrd_parameters) syntax structure is a syntax structure that contains sequence level HRD parameters. An operation point (OP) is a temporal subset of an OLS that is identified by an OLS index and a highest temporal ID. An OP under test (targetOp) is an OP that is selected for conformance testing at a HRD. A target OLS is an OLS that is selected for extraction from a bitstream. A decoding unit HRD parameters present flag (decoding_unit_hrd_params_present_flag) is a flag that indicates whether corresponding HRD parameters operate at a decoding unit (DU) level or an AU level. A coded picture buffer (CPB) is a first-in first-out buffer in a HRD that contains coded pictures in decoding order for use during bitstream conformance verification. A decoded picture buffer (DPB) is a buffer for holding decoded pictures for reference, output reordering, and/or output delay.

Decoded picture buffer (DPB) parameters are a syntax structure that provides a DPB size and, optionally, a maximum picture reorder number and maximum latency information. The maximum picture reorder number and maximum latency information may be collectively referred to by the acronym MRML.

The following acronyms are used herein, Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Picture Parameter Set (PPS), Raw Byte Sequence Payload (RBSP), Sequence Parameter Set (SPS), Versatile Video Coding (VVC), and Working Draft (WD).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and case of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
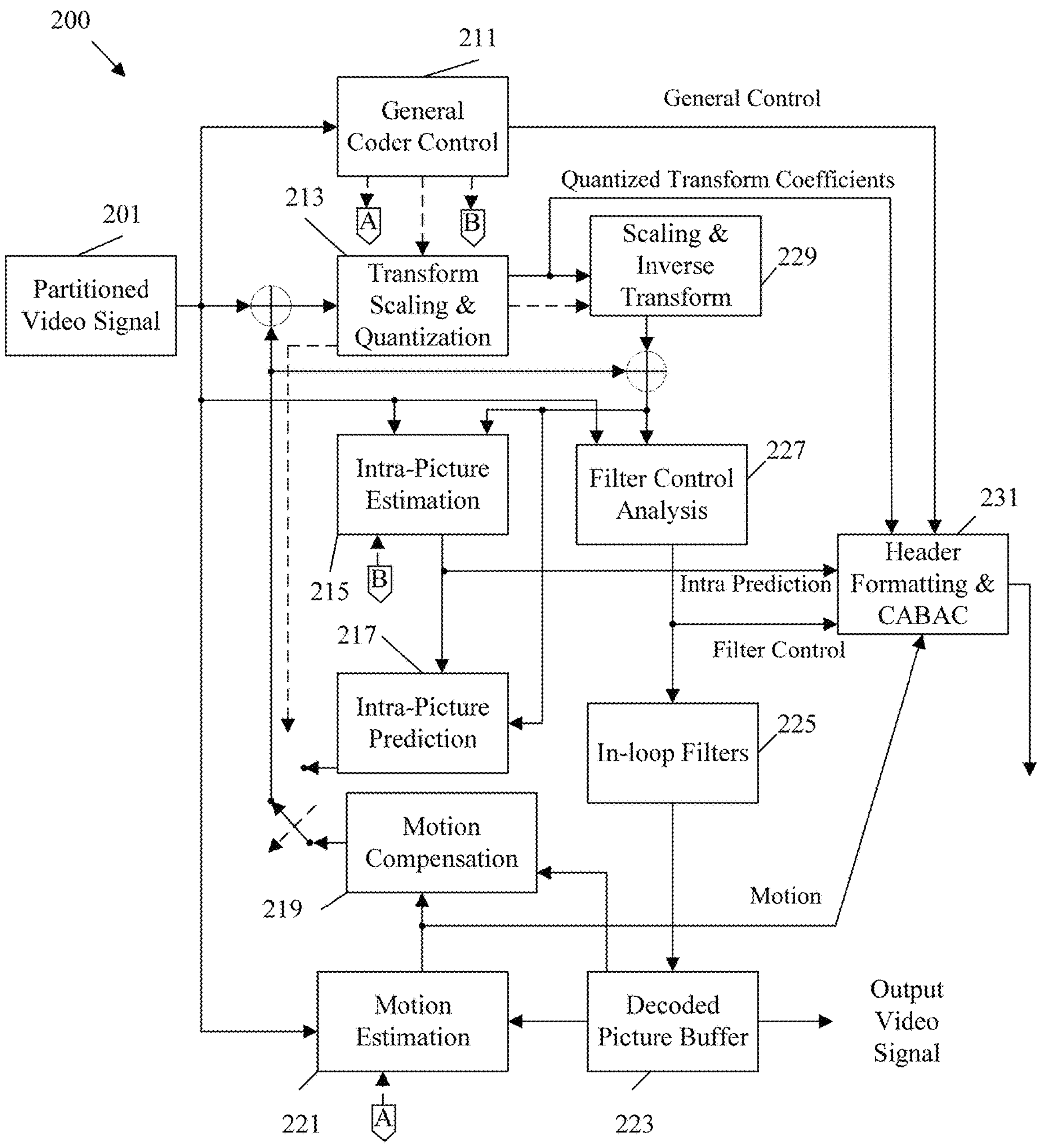
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
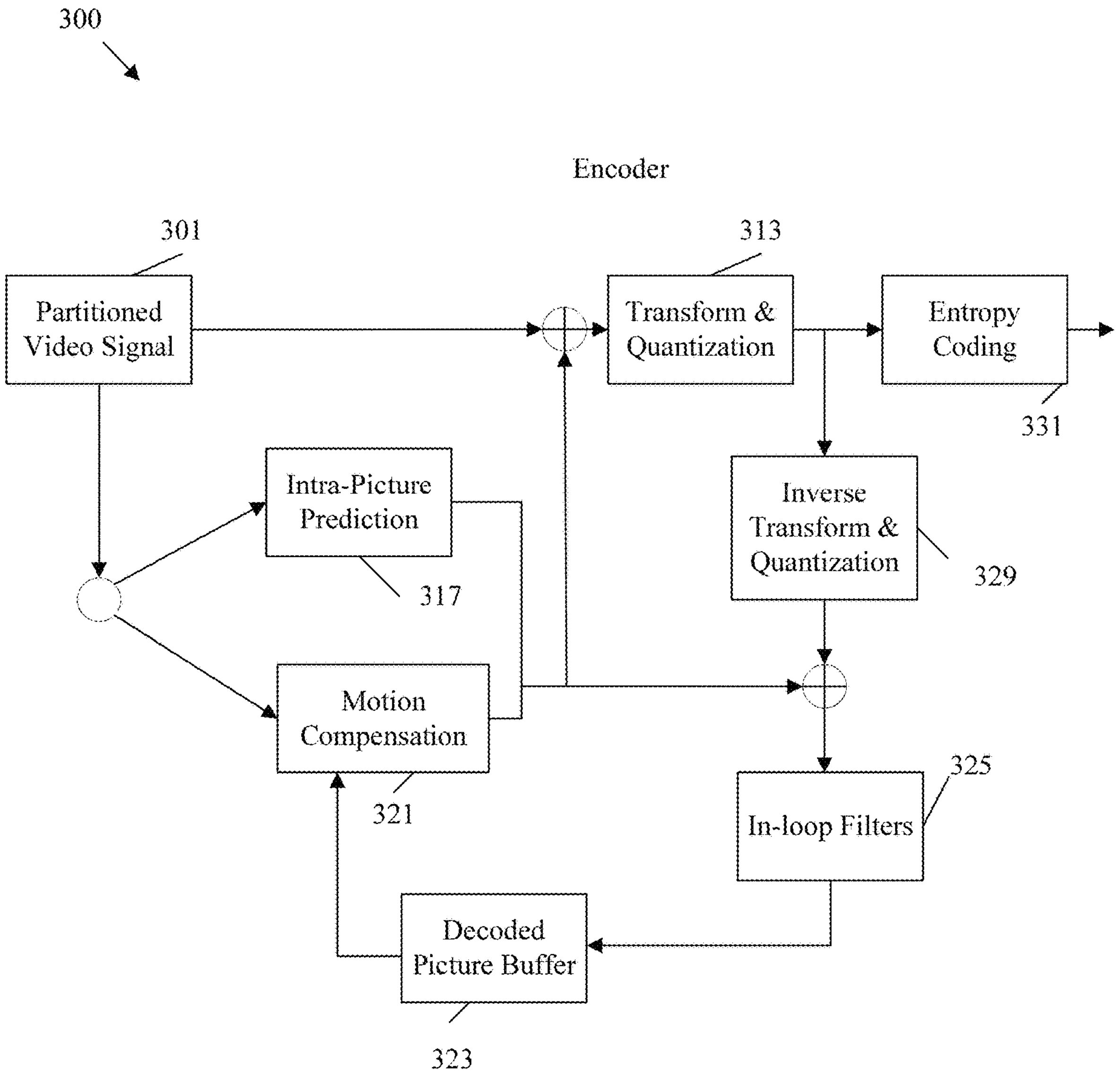
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
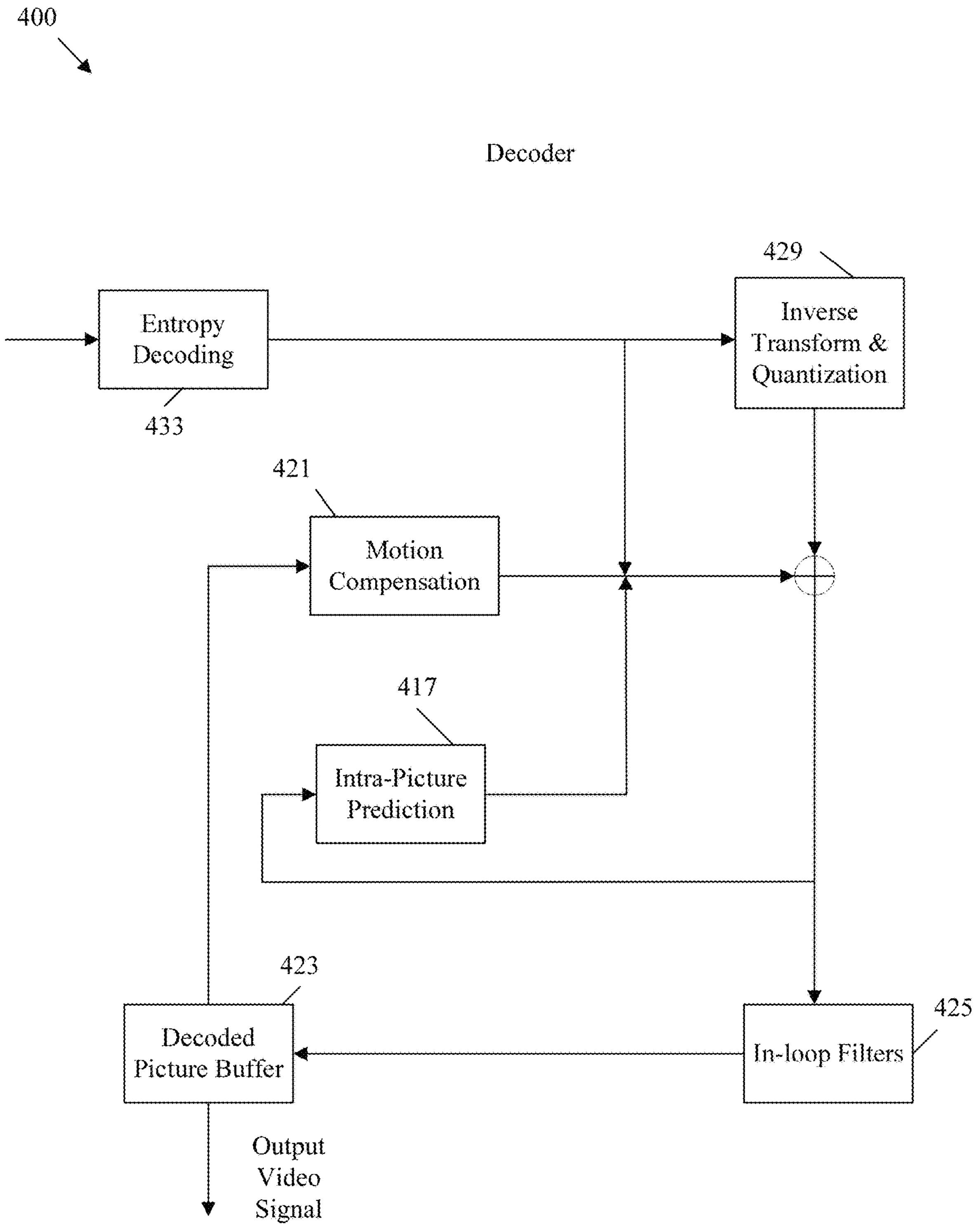
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and to intra-picture prediction component 217.

Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames. The POC is a variable associated with each picture that uniquely identifies the associated picture among all pictures in the coded layer video sequence (CLVS), indicates when the associated picture is to be output from the DPB, and indicates the position of the associated picture in output order relative to the output order positions of the other pictures in the same CLVS that are to be output from the DPB. A flag is a variable or single-bit syntax element that can take one of the two possible values: 0 and 1.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

Scalability in video coding usually is supported by using multi-layer coding techniques. A multi-layer bitstream comprises a base layer (BL) and one or more enhancement layers (ELs). An example of scalabilities includes spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 5:
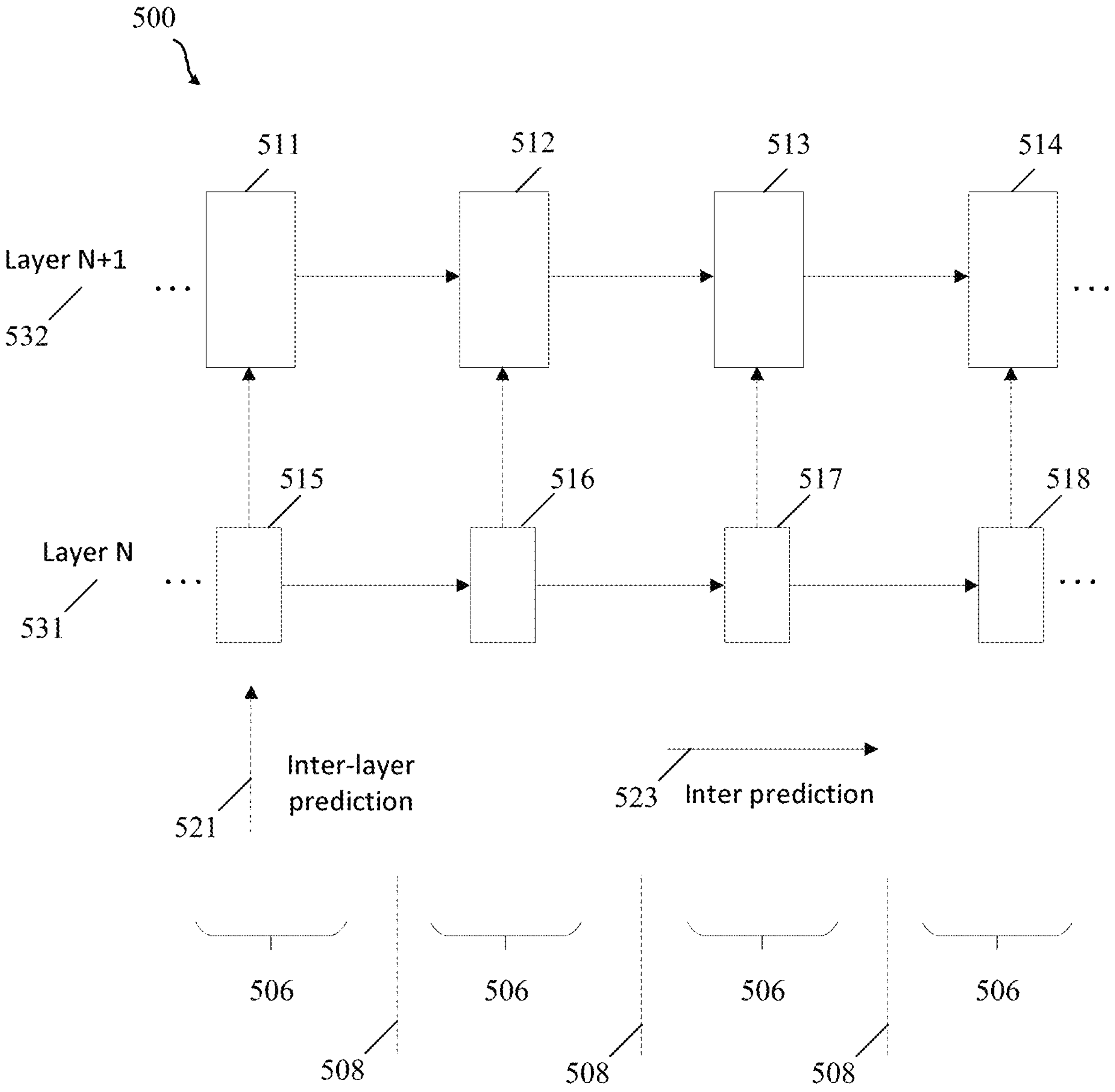
FIG. 5 illustrates an example of multi-layer coding for spatial scalability.

FIG. 5 is a schematic diagram illustrating an example of layer based prediction 500, for example as performed to determine motion vectors (MVs) at block compression step 105, block decoding step 113, motion estimation component 221, motion compensation component 219, motion compensation component 321, and/or motion compensation component 421. Layer based prediction 500 is compatible with unidirectional inter-prediction and/or bidirectional inter-prediction, but is also performed between pictures in different layers.

Layer based prediction 500 is applied between pictures 511, 512, 513, and 514 and pictures 515, 516, 517, and 518 in different layers. In the example shown, pictures 511, 512, 513, and 514 are part of layer N+1 532 and pictures 515, 516, 517, and 518 are part of layer N 531. A layer, such as layer N 531 and/or layer N+1 532, is a group of pictures that are all associated with a similar value of a characteristic, such as a similar size, quality, resolution, signal to noise ratio, capability, etc. In the example shown, layer N+1 532 is associated with a larger image size than layer N 531. Accordingly, pictures 511, 512, 513, and 514 in layer N+1 532 have a larger picture size (e.g., larger height and width and hence more samples) than pictures 515, 516, 517, and 518 in layer N 531 in this example. However, such pictures can be separated between layer N+1 532 and layer N 531 by other characteristics. While only two layers, layer N+1 532 and layer N 531, are shown, a set of pictures can be separated into any number of layers based on associated characteristics. Layer N+1 532 and layer N 531 may also be denoted by a layer ID. A layer ID is an item of data that is associated with a picture and denotes the picture is part of an indicated layer. Accordingly, each picture 511-518 may be associated with a corresponding layer ID to indicate which layer N+1 532 or layer N 531 includes the corresponding picture.

Pictures 511-518 in different layers 531-532 are configured to be displayed in the alternative. As such, pictures 511-518 in different layers 531-532 can share the same temporal identifier (ID) and can be included in the same AU. As used herein, an AU is a set of one or more coded pictures associated with the same display time for output from a DPB. For example, a decoder may decode and display picture 515 at a current display time if a smaller picture is desired or the decoder may decode and display picture 511 at the current display time if a larger picture is desired. As such, pictures 511-514 at higher layer N+1 532 contain substantially the same image data as corresponding pictures 515-518 at lower layer N 531 (notwithstanding the difference in picture size). Specifically, picture 511 contains substantially the same image data as picture 515, picture 512 contains substantially the same image data as picture 516, etc.

Pictures 511-518 can be coded by reference to other pictures 511-518 in the same layer N 531 or N+1 532. Coding a picture in reference to another picture in the same layer results in inter-prediction 523, which is compatible with unidirectional inter-prediction and/or bidirectional inter-prediction. Inter-prediction 523 is depicted by solid line arrows. For example, picture 513 may be coded by employing inter-prediction 523 using one or two of pictures 511, 512, and/or 514 in layer N+1 532 as a reference, where one picture is referenced for unidirectional inter-prediction and/or two pictures are referenced for bidirectional inter-prediction. Further, picture 517 may be coded by employing inter-prediction 523 using one or two of pictures 515, 516, and/or 518 in layer N 531 as a reference, where one picture is referenced for unidirectional inter-prediction and/or two pictures are referenced for bidirectional inter-prediction. When a picture is used as a reference for another picture in the same layer when performing inter-prediction 523, the picture may be referred to as a reference picture. For example, picture 512 may be a reference picture used to code picture 513 according to inter-prediction 523. Inter-prediction 523 can also be referred to as intra-layer prediction in a multi-layer context. As such, inter-prediction 523 is a mechanism of coding samples of a current picture by reference to indicated samples in a reference picture that are different from the current picture where the reference picture and the current picture are in the same layer.

Pictures 511-518 can also be coded by reference to other pictures 511-518 in different layers. This process is known as inter-layer prediction 521, and is depicted by dashed arrows. Inter-layer prediction 521 is a mechanism of coding samples of a current picture by reference to indicated samples in a reference picture where the current picture and the reference picture are in different layers and hence have different layer IDs. For example, a picture in a lower layer N 531 can be used as a reference picture to code a corresponding picture at a higher layer N+1 532. As a specific example, picture 511 can be coded by reference to picture 515 according to inter-layer prediction 521. In such a case, the picture 515 is used as an inter-layer reference picture. An inter-layer reference picture is a reference picture used for inter-layer prediction 521. In most cases, inter-layer prediction 521 is constrained such that a current picture, such as picture 511, can only use inter-layer reference picture(s) that are included in the same AU and that are at a lower layer, such as picture 515. When multiple layers (e.g., more than two) are available, inter-layer prediction 521 can encode/decode a current picture based on multiple inter-layer reference picture(s) at lower levels than the current picture.

A video encoder can employ layer based prediction 500 to encode pictures 511-518 via many different combinations and/or permutations of inter-prediction 523 and inter-layer prediction 521. For example, picture 515 may be coded according to intra-prediction. Pictures 516-518 can then be coded according to inter-prediction 523 by using picture 515 as a reference picture. Further, picture 511 may be coded according to inter-layer prediction 521 by using picture 515 as an inter-layer reference picture. Pictures 512-514 can then be coded according to inter-prediction 523 by using picture 511 as a reference picture. As such, a reference picture can serve as both a single layer reference picture and an inter-layer reference picture for different coding mechanisms. By coding higher layer N+1 532 pictures based on lower layer N 531 pictures, the higher layer N+1 532 can avoid employing intra-prediction, which has much lower coding efficiency than inter-prediction 523 and inter-layer prediction 521. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 506 in FIG. 5 may contain several pictures. For example, one AU 506 may contain pictures 511 and 515. Another AU 506 may contain pictures 512 and 516. Indeed, each AU 506 is a set of one or more coded pictures associated with the same display time (e.g., the same temporal ID) for output from a decoded picture buffer (DPB) (e.g., for display to a user). Each AUD 508 is an indicator or data structure used to indicate the start of an AU (e.g., AU 508) or the boundary between AUs.

Previous H.26x video coding families have provided support for scalability in separate profile(s) from the profile (s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides supports for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Figure 6:
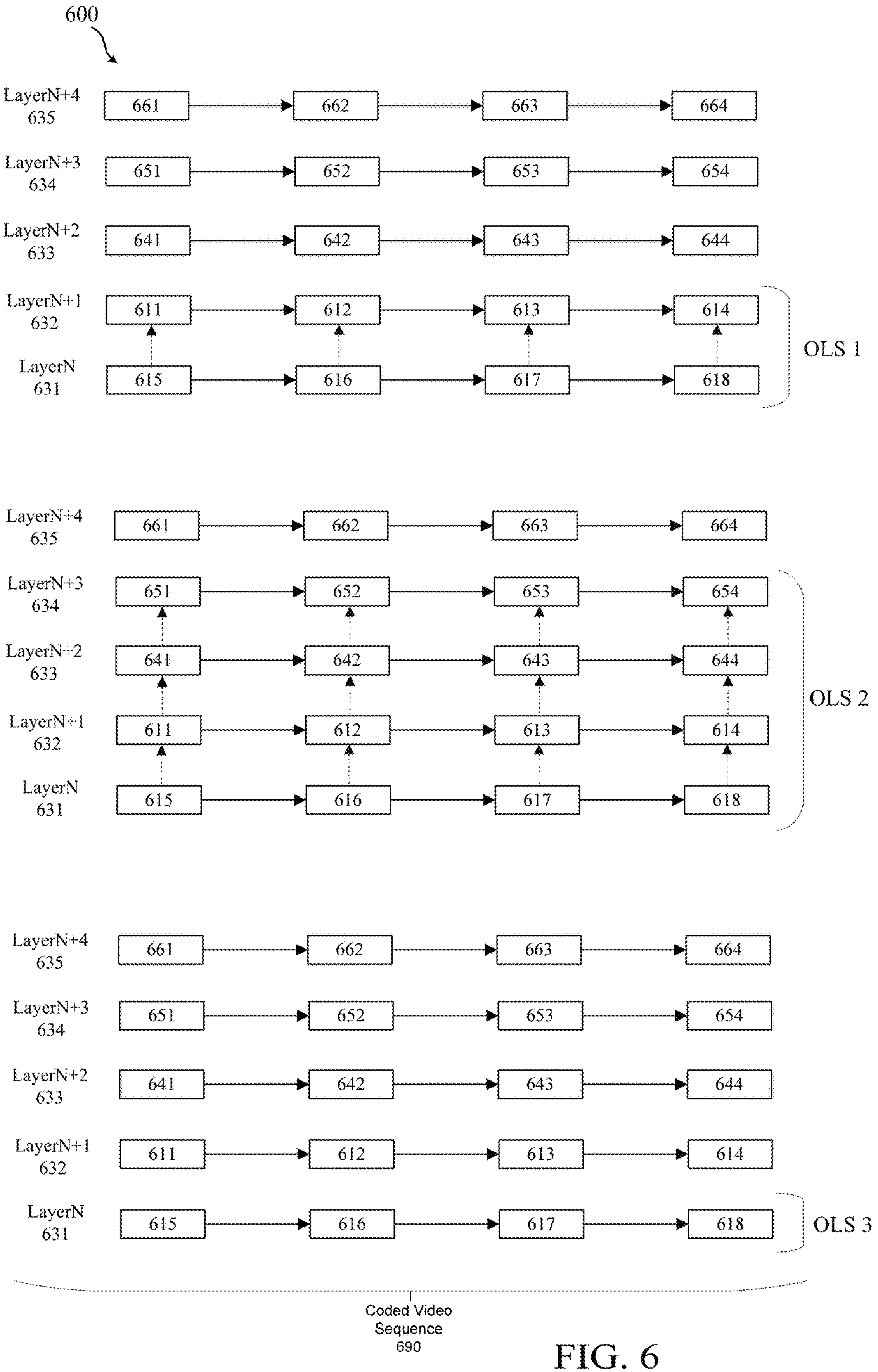
FIG. 6 illustrates an example of multi-layer coding using output layer sets (OLSs).

FIG. 6 illustrates an example of layer based prediction 600 utilizing output layer sets (OLSs), for example as performed to determine MVs at block compression step 105, block decoding step 113, motion estimation component 221, motion compensation component 219, motion compensation component 321, and/or motion compensation component 421. Layer based prediction 600 is compatible with unidirectional inter-prediction and/or bidirectional inter-prediction, but is also performed between pictures in different layers. The layer based prediction of FIG. 6 is similar to that of FIG. 5. Therefore, for the sake of brevity, a full description of layer based prediction is not repeated.

Some of the layers in the coded video sequence (CVS) 690 of FIG. 6 are included in an OLS. An OLS is a set of layers for which one or more layers are specified as the output layers. An output layer is a layer of an OLS that is output. FIG. 6 depicts three different OLSs, namely OLS 1, OLS 2, and OLS 3. As shown, OLS 1 includes Layer N 631 and Layer N+1 632. OLS 2 includes Layer N 631, Layer N+1 632, Layer N+2 633, and Layer N+3 634. OLS 3 includes Layer N 631. That is, OLS 3 includes only a single layer. In practical applications, other OLSs may also contain only a single layer. Despite three OLSs being shown, a different number of OLSs may be used in practical applications. Other layers, such as Layer N+4 635, are not included in the illustrated OLSs (e.g., OLS 1, 2, and 3) but are available for inclusion in other OLSs.

Each of the different OLSs may contain any number of layers. The different OLSs are generated in an effort to accommodate the coding capabilities of a variety of different devices having varying coding capabilities. For example, OLS 3, which contains only one layer, may be generated to accommodate a mobile phone with relatively limited coding capabilities. On the other hand, OLS 2, which contains four layers, may be generated to accommodate a big screen television, which is able to decode higher layers than the mobile phone. OLS 1, which contains two layers, may be generated to accommodate a personal computer, laptop computer, or a tablet computer, which may be able to decode higher layers than the mobile phone but cannot decode the highest layers like the big screen television.

The layers in FIG. 6 can be all independent from each other. That is, each layer can be coded without using inter-layer prediction (ILP). In this case, the layers are referred to as simulcast layers. One or more of the layers in FIG. 6 may also be coded using ILP. Whether the layers are simulcast layers or whether some of the layers are coded using ILP is signaled by a flag in a video parameter set (VPS), which will be more fully discussed below. When some layers use ILP, the layer dependency relationship among layers is also signaled in the VPS.

In an embodiment, when the layers are simulcast layers, only one layer is selected for decoding and output. In an embodiment, when some layers use ILP, all of the layers (e.g., the entire bitstream) are specified to be decoded, and certain layers among the layers are specified to be output layers. The output layer or layers may be, for example, 1) only the highest layer, 2) all the layers, or 3) the highest layer plus a set of indicated lower layers. For example, when the highest layer plus a set of indicated lower layers are designated for output by a flag in the VPS, layer N+3 634 (which is the highest layer) and layers N 631 and N+1 632 (which are lower layers) from OLS 2 are output.

As shown in FIG. 6, each layer is comprised of any number of pictures. For example, Layer N 631 includes pictures 615-618, Layer N+1 632 includes pictures 611-614, Layer N+2 633 includes pictures 641-644, Layer N+3 634 includes pictures 651-654, and Layer N+4 635 includes pictures 661-664.

Video coding standards like HEVC, SHVC, MV-HEVC, and VVC specify and signal a profile, a tier, and a level. Profiles, tiers, and levels specify restrictions on bitstreams and hence limits on the capabilities needed to decode the bitstreams. Profiles, tiers, and levels may also be used to indicate interoperability points between individual decoder implementations. A profile is a defined set of coding tools used to create a compliant or conforming bitstream. Each profile specifies a subset of algorithmic features and limits that shall be supported by all decoders conforming to that profile.

A level is a set of constraints for a bitstream (e.g., max luma sample rate, max bit rate for a resolution, etc.). That is, a level is a set of constraints that indicate the required decoder performance to playback a bitstream of the specified profile.

The levels are split into two tiers: Main and High. The Main tier is a lower tier than the High tier. The tiers were made to deal with applications that differ in terms of their maximum bit rate. The Main tier was designed for most applications while the High tier was designed for very demanding applications. The set of constraints and/or tiers corresponding to the levels may be referred to herein as level information.

Each level of a tier specifies a set of limits on the values that may be taken by the syntax elements of a particular standard (e.g., HEVC, VVC). The same set of tier and level definitions is used with all profiles, but individual implementations may support a different tier and within a tier a different level for each supported profile. For any given profile, a level of a tier generally corresponds to a particular decoder processing load and memory capability.

Using the HEVC standard, a representative example of levels and tiers for different profiles is provided in Table 1 below.

TABLE 1

| | Max bit rate for Main 4:4:4 12 profile (1000 bits/sec) | | Max bit rate for High Throughput 4:4:4 16 Intra profile (1000 bits/sec) | | Example picture resolution at highest frame rate |
|---|---|---|---|---|---|
| Level | Main tier | High tier | Main tier | High tier | (MaxDPBsize) |
| 5.2 | 180,000 | 720,000 | 5,760,000 | 23,040,000 | 4,096 × 2,160@120.0 |
| 6 | 180,000 | 720,000 | 5,760,000 | 23,040,000 | 8,192 × 4,320@30.0 |
| 6.1 | 180,000 | 720,000 | 11,520,000 | 46,080,000 | 8,192 × 4,320@60.0 |
| 6.2 | 720,000 | 2,400,000 | 23,040,000 | 76,800,000 | 8,192 × 4,320@120.0 |

Profile, tier, and level (PTL) parameters are a syntax structure (e.g., the i-th profile_tier_level( ) syntax structure) that provides profile, tier, and/or level as noted in the table above. Decoded picture buffer (DPB) parameters are a syntax structure (e.g., the i-th dpb_parameters( ) syntax structure) that provides a DPB size and, optionally, a maximum picture reorder number and maximum latency information. The maximum picture reorder number and maximum latency information may be collectively referred to by the acronym MRML. HRD parameters are a syntax structure (e.g., i-th ols_timing_hrd_parameters( ) syntax structure) that initialize and/or define operational conditions of the HRD. Further details and specifics regarding one or more of the PTL parameters, the DPB parameters, and the HRD parameters are provided below.

In an embodiment, the maximum picture reorder number is designated dpb_max_num_reorder_pics[i], which specifies the maximum allowed number of pictures of the OLS that can precede any picture in the OLS in decoding order and follow that picture in output order when Htid is equal to i. The value of dpb_max_num_reorder_pics[i] shall be in the range of 0 to dpb_max_dec_pic_buffering_minus1[i], inclusive. When i is greater than 0, dpb_max_num_reorder_pics[i] shall be greater than or equal to dpb_max_num_reorder_pics[i−1]. When dpb_max_num_reorder_pics[i] is not present for i in the range of 0 to MaxSubLayersMinus1−1, inclusive, due to subLayerInfoFlag being equal to 0, it is inferred to be equal to dpb_max_num_reorder_pics[MaxSubLayersMinus1]. Htid is a variable which identifies the highest temporal sublayer to be decoded.

dpb_max_dec_pic_buffering_minus1[i] plus 1 specifies the maximum required size of the DPB in units of picture storage buffers when Htid is equal to i. The value of dpb_max_dec_pic_buffering_minus1[i] shall be in the range of 0 to MaxDpbSize−1, inclusive, where MaxDpbSize is as specified in subclause A.4.2 of the VVC standard. When i is greater than 0, dpb_max_dec_pic_buffering_minus1[i] shall be greater than or equal to dpb_max_dec_pic_buffering_minus1[i−1]. When dpb_max_dec_pic_buffering_minus1[i] is not present for i in the range of 0 to MaxSubLayersMinus1−1, inclusive, due to subLayerInfoFlag being equal to 0, it is inferred to be equal to dpb_max_dec_pic_buffering_minus1[MaxSubLayersMinus1].

In an embodiment, maximum latency information is designated dpb_max_latency_increase_plus1[i]. dpb_max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i.

$$MaxLatencyPictures[i] = \text{dpb\_max\_num\_reorder\_pics}[i] + \text{dpb\_max\_latency\_increase\_plus1}[i] - 1.$$

The PTL syntax structures (a.k.a., the PTL parameters) for the OLSs described above are included in the VPS of the bitstream. Unfortunately, signaling all of these PTL syntax structures in the VPS is inefficient when an OLS contains only a single layer (e.g., OLS 3 in FIG. 6).

Disclosed herein are techniques that ensure the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

Figure 7:
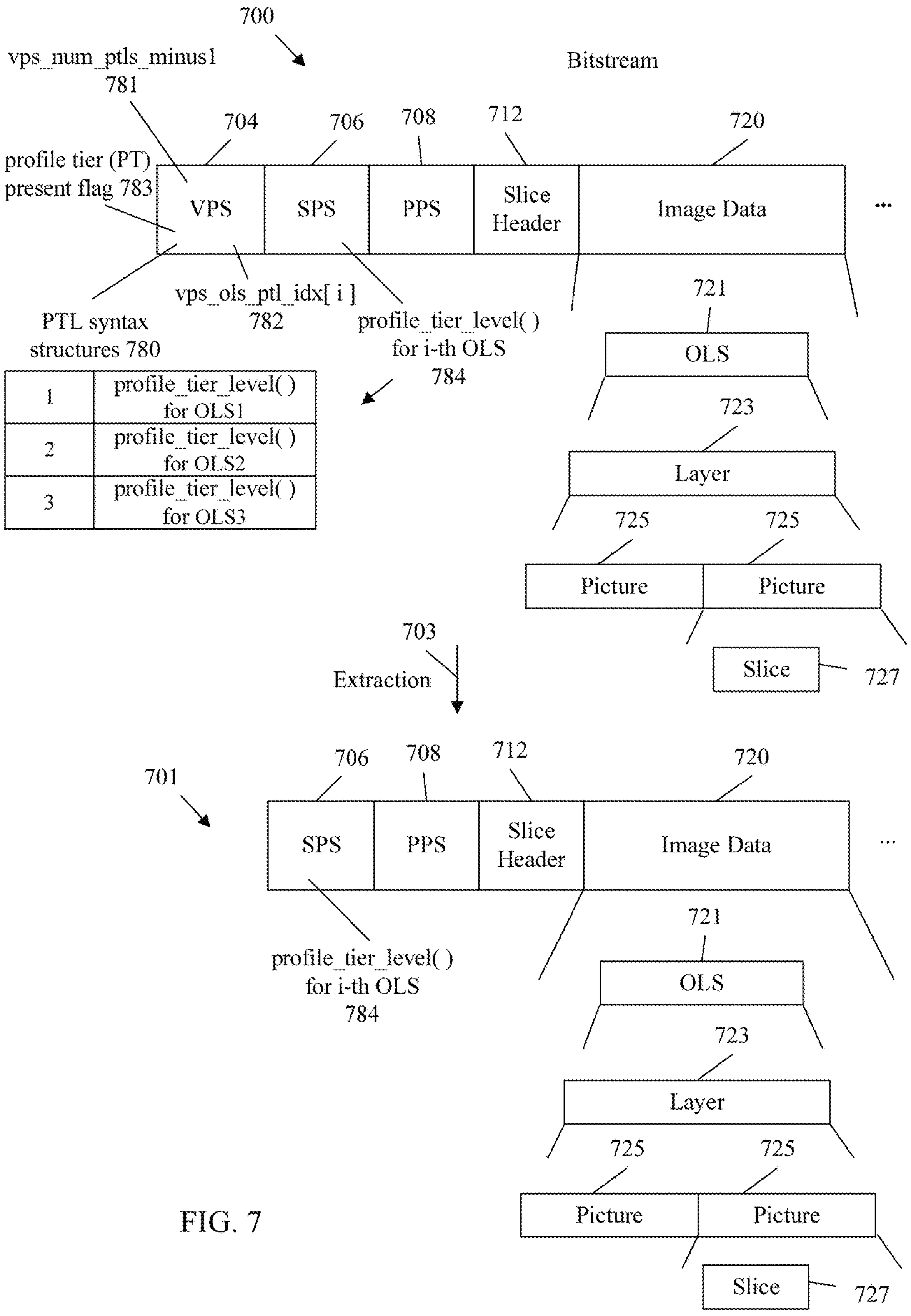
FIG. 7 illustrates an embodiment of a video bitstream.

FIG. 7 illustrates an embodiment of a video bitstream 700. As used herein the video bitstream 700 may also be referred to as a coded video bitstream, a bitstream, or variations thereof. As shown in FIG. 7, the bitstream 700 includes a video parameter set (VPS) 704, a sequence parameter set (SPS) 706, a picture parameter set (PPS) 708, a slice header 712, and image data 720. Each of the VPS 704, the SPS 706, and the PPS 708 may be generically referred to as a parameter set. In an embodiment, other parameter sets and/or headers not shown in FIG. 7 may also be included in the bitstream 700.

The VPS 704 includes decoding dependency or information for reference picture set construction of enhancement layers. The VPS 704 provides an overall perspective or view of a scalable sequence, including what types of operation points are provided, the profile, tier, and level of the operation points, and some other high-level properties of the bitstream 700 that can be used as the basis for session negotiation and content selection, etc.

In an embodiment, the VPS 704 includes a list of the PTL syntax structures 780 for all OLSs. In an embodiment, each of the PTL syntax structures in the list of PTL syntax structures 780 is designated profile_tier_level( ). The VPS 704 also includes the syntax structure vps_ols_ptl_idx[i] 782. The syntax structure vps_ols_ptl_idx[i] 782 specifies the index of the PTL syntax structure that applies to the i-th OLS. That is, each index value corresponds to one of the PTL syntax structures in the list. By way of example, index value 1 in the list corresponds to the profile_tier_level( ) for OLS 1, index value 2 corresponds to profile_tier_level( ) for OLS 2, and index value 3 corresponds to profile_tier_level( ) for OLS 3.

When present, the value of vps_ols_ptl_idx[i] is in the range of 0 to vps_num_ptls_minus1, inclusive. The syntax structure vps_num_ptls_minus1 781 is included in the VPS 704. The syntax structure vps_num_ptls_minus1, plus 1, specifies the number of PTL syntax structures in the VPS

704. For example, when the value of vps_num_ptls_minus1 781 is two, the number of PTL syntax structures in the VPS 704 is three (2+1=3). The value of vps_num_ptls_minus1 781 is less than the total number of OLSs, which may be designated as TotalNumOlss. When not present in the bitstream 700, the value of vps_num_ptls_minus1 781 is inferred to be equal to 0.

In an embodiment, the VPS 704 includes a profile tier (PT) present flag 783, which may be designated vps_pt_present_flag[i]. The syntax structure vps_pt_present_flag[i] equal to 1 specifies that profile, tier, and general constraints information are present in the i-th profile_tier_level( ) syntax structure in the VPS 704. The syntax structure vps_pt_present_flag[i] equal to 0 specifies that profile, tier, and general constraints information are not present in the i-th profile_tier_level( ) syntax structure in the VPS 783. The value of vps_pt_present_flag[0] is inferred to be equal to 1. When vps_pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS.

The SPS 706 contains data that is common to all the pictures in a sequence of pictures (SOP). The SPS 706 is a syntax structure containing syntax elements that apply to zero or more entire CLVSs as determined by the content of a syntax element found in the PPS referred to by a syntax element found in each picture header.

In an embodiment, the profile_tier_level( ) that applies to the i-th OLS 784 is present in the SPS 706 referred to by the layer in the i-th OLS when the variable NumLayersInOls[i] is equal to 1. The variable NumLayersInOls[i] specifies the number of layers in the i-th OLS. For example, when the variable NumLayersInOls[i] has a value of 1, the i-th OLS contains only a single layer (e.g., OLS 3 in FIG. 6). In contrast, when the variable NumLayersInOls[i] has a value of 4, the i-th OLS contains four layers (e.g., OLS 2 in FIG. 6). The variable NumLayersInOls[i] is not signaled by the encoder. Rather, the variable NumLayersInOls[i] is derived by the decoder.

In an embodiment, the variable NumLayersInOls[i] is derived as follows.

```
NumLayersInOls[ 0 ] = 1
LayerIdInOls[ 0 ][ 0 ] = vps_layer_id[ 0 ]
NumMultiLayerOlss = 0
for( i = 1; i < TotalNumOlss; i++ ) {
  if( vps_each_layer_is_an_ols_flag ) {
    NumLayersInOls[ i ] = 1
    LayerIdInOls[ i ][ 0 ] = vps_layer_id[ i ]                    (33)
  } else if( vps_ols_mode_ide = = 0 | | vps_ols_mode_idc = = 1 ) {
    NumLayersInOls[ i ] = i + 1
    for( j = 0; j < NumLayersInOls[ i ]; j++ )
      LayerIdInOls[ i ][ j ] = vps_layer_id[ j ]
  } else if( vps_ols_mode_idc = = 2 ) {
    for( k = 0, j = 0; k <= vps_max_layers_minus1; k++ )
      if( layerIncludedInOlsFlag[ i ][ k ] )
        LayerIdInOls[ i ][ j++ ] = vps_layer_id[ k ]
    NumLayersInOls[ i ] = j
  }
  if( NumLayersInOls[ i ] > 1 ) {
    MultiLayerOlsIdx[ i ] = NumMultiLayerOlss
    NumMultiLayerOlss++
  }
}
```

Based on the foregoing, it should be appreciated that when the variable NumLayersInOls[i] is equal to 1, the profile_tier_level( ) that applies to the i-th OLS 784 is present in both the SPS 706 and the VPS 704 (i.e., the PTL syntax structure that applies to the i-th OLS is one of the PTL syntax structures included in the PTL structures 780). Moreover, the profile_tier_level( ) that applies to the i-th OLS 784 in the SPS 706 is identical to the profile_tier_level( ) that applies to the i-th OLS 784 in the VPS 704.

In contrast to the SPS 706, the PPS 708 contains data that is common to the entire picture. The PPS 708 is a syntax structure containing syntax elements that apply to zero or more entire coded pictures. The slice header 712 is a part of a coded slice containing data elements pertaining to all video data within a tile represented in the slice. The slice header 712 contains parameters that are specific to each slice in a picture. Hence, there may be one slice header 712 per slice in the video sequence. The slice header 712 may contain slice type information, picture order counts (POCs), reference picture lists (RPLs), prediction weights, tile entry points, or deblocking parameters. A slice header 712 may also be referred to as a tile group header and/or a picture header (PH).

In an embodiment, the VPS 704 and/or the SPS 706 contain the following SPS syntax and semantics to implement one or more of the embodiments disclosed herein.

The VPS syntax includes the following.

```
                                                              Descriptor
video_parameter_set_rbsp( ) {
  vps_video_parameter_set_id                                  u(4)
  vps_max_layers_minus1                                       u(6)
  vps_max_sub_layers_minus1                                   u(3)
  if( vps_max_layers_minus1 > 0 &&
  vps_max_sub_layers_minus1 > 0 )
    vps_all_layers_same_num_sub_layers_flag                   u(1)
  if( vps_max_layers_minus1 > 0 )
    vps_all_independent_layers_flag                           u(1)
  ...
  vps_num_ptls                                                u(8)
  for( i = 0; i < vps_num_ptls; i++ ) {
    if( i > 0 )
      pt_present_flag[ i ]                                    u(1)
    if( vps_max_sub_layers_minus1 > 0 &&
!vps_all_layers_same_num_sub_layers_flag )
      ptl_max_temporal_id[ i ]                                u(3)
  }
  while( !byte_aligned())
    vps_ptl_byte_alignment_zero_bit /* equal to 0 */          u(1)
  for( i = 0; i < vps_num_ptls; i++ )
    profile_tier_level( pt_present_flag[ i ],
    ptl_max_temporal_id[ i ] )
  for( i = 0; i < TotalNumOlss; i++ )
    if( NumLayersInOls[ i ] > 1 && vps_num_ptls > 1 )
      ols_ptl_idx[ i ]                                        u(8)
  if( !vps_all_independent_layers_flag )
    vps_num_dpb_params                                        ue(v)
  if( vps_num_dpb_params > 0 ) {
    same_dpb_size_output_or_nonoutput_flag                    u(1)
    if( vps_max_sub_layers_minus1 > 0 )
      vps_sub_layer_dpb_params_present_flag                   u(1)
  }
  for( i = 0; i < vps_num_dpb_params; i++ ) {
    dpb_size_only_flag[ i ]                                   u(1)
    if( vps_max_sub_layers_minus1 > 0 &&
!vps_all_layers_same_num_sub_layers_flag )
      dpb_max_temporal_id[ i ]                                u(3)
    dpb_parameters( dpb_size_only_flag[ i ],
    dpb_max_temporal_id[ i ],
        vps_sub_layer_dpb_params_present flag )
  }
  for( i = 0; i < vps_max_layers_minus1 &&
vps_num_dpb_params > 1; i++ ) {
    if( !vps_independent_layer_flag[ i ] )
      layer_output_dpb_params_idx[ i ]                        ue(v)
    if( LayerUsedAsRefLayerFlag[ i ] &&
!same_dpb_size_output_or_nonoutput_flag )
```

-continued

| | Descriptor |
|---|---|
| layer_nonoutput_dpb_params_idx[ i ] | ue(v) |
| } | |
| general_hrd_params_present_flag | u(1) |
| if( general_hrd_params_present_flag ) { | |
| num_units_in_tick | u(32) |
| time_scale | u(32) |
| general_hrd_parameters( ) | |
| } | |
| vps_extension_flag | u(1) |
| if( vps_extension_flag ) | |
| while( more_rbsp_data( ) ) | |
| vps_extension_data_flag | u(1) |
| rbsp_trailing_bits( ) | |
| } | |

The SPS raw byte sequence payload (RBSP) syntax includes the following.

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_4bits | u(4) |
| sps_ptl_dpb_present_flag | u(1) |
| if( sps_ptl_dpb_present_flag ) | |
| profile_tier_level( 1, sps_max_sub_layers_minus1 ) | |
| gdr_enabled_flag | u(1) |
| sps_seq_parameter_set_id | ue(v) |
| chroma_format_idc | ue(v) |
| ... | |
| log2_max_pic_order_cnt_lsb_minus4 | ue(v) |
| poc_msb_in_rap_pics_flag | u(1) |
| if( poc_msb_in_rap_pics_flag > 0 ) | |
| poc_msb_len_minus1 | ue(v) |
| if( sps_max_sub_layers_minus1 > 0 ) | |
| sps_sub_layer_dpb_params_flag | u(1) |
| if( sps_ptl_dpb_present_flag ) | |
| dpb_parameters( 0, sps_max_sub_layers_minus1, sps_sub_layer_dpb_params_flag ) | |
| for( i = ( sps_sub_layer_ordering_info_present_flag ? 0 : sps_max_sub_layers_minus1 ); | |
| i <= sps_max_sub_layers_minus1; i++) { | |
| sps_max_dec_pic_buffering_minus1[ i ] | ue(v) |
| sps_max_num_reorder_pics[ i ] | ue(v) |
| sps_max_latency_increase_plusl[ i ] | ue(v) |
| } | |
| long_term_ref_pics_flag | u(1) |
| ... | |
| sps_scaling_list_enabled_flag | u(1) |
| general_hrd_parameters_present_flag | u(1) |
| if( general_hrd_parameters_present_flag ) { | |
| num_units_in_tick | u(32) |
| time_scale | u(32) |
| sub_layer_cpb_parameters_present_flag | u(1) |
| if( sub_layer_cpb_parameters_present_flag ) | |
| general_hrd_parameters( 0, sps_max_sub_layers_minus1 ) | |
| else | |
| general_hrd_parameters( sps_max_sub_layers_minus1, sps_max_sub_layers_minus1 ) | |
| } | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

The DPB syntax includes the following.

| | Descriptor |
|---|---|
| dpb_parameters( dpbSizeOnlyFlag, maxSubLayersMinus1, subLayerInfoFlag ) { | |
| for( i = ( subLayerInfoFlag ? 0 : maxSubLayersMinus1 ); | |
| i <= maxSubLayersMinus1; i++ ) { | |
| max_dec_pic_buffering_minus1[ i ] | ue(v) |
| if( !dpbSizeOnlyFlag ) { | |
| max_num_reorder_pics[ i ] | ue(v) |
| max_latency_increase_plus1[ i ] | ue(v) |
| } | |
| } | |
| } | |

The HRD parameters syntax includes general HRD parameters syntax. OLS HRD parameters syntax, and sub-layer HRD parameters syntax.

The general HRD parameters syntax includes the following.

| | Descriptor |
|---|---|
| general_hrd_parameters( ) { | |
| general_nal_hrd_params_present_flag | u(1) |
| general_vcl_hrd_params_present_flag | u(1) |
| if( general_nal_hrd_params_present_flag \| \| general_vcl_hrd_params_present_flag ) { | |
| decoding_unit_hrd_params_present_flag | u(1) |
| if( decoding_unit_hrd_params_present_flag ) { | |
| tick_divisor_minus2 | u(8) |
| decoding_unit_cpb_params_in_pic_timing_sei_flag | u(1) |
| } | |
| bit_rate_scale | u(4) |
| cpb_size_scale | u(4) |
| if( decoding_unit_hrd_params_present_flag ) | |
| cpb_size_du_scale | u(4) |
| } | |
| if( vps_max_sub_layers_minus1 > 0 ) | |
| sub_layer_cpb_params_present_flag | u(1) |
| if( TotalNumOlss > 1 ) | |
| num_ols_hrd_params_minus1 | ue(v) |
| hrd_cpb_cnt_minus1 | ue(v) |
| for( i = 0; i <= num_ols_hrd_params_minus1; i++ ) { | |
| if( vps_max_sub_layers_minus1 > 0 && !vps_all_layers_same_num_sub_layers_flag ) | |
| hrd_max_temporal_id[ i ] | u(3) |
| ols_hrd_parameters( hrd_max_temporal_id[ i ] ) | |
| } | |
| if( num_ols_hrd_params_minus1 > 0 ) | |
| for( i = 1; i < TotalNumOlss; i++ ) | |
| ols_hrd_idx[ i ] | ue(v) |
| } | |

The OLS HRD parameters syntax includes the following.

| | Descriptor |
|---|---|
| ols_hrd_parameters( hrdMaxTid ) { | |
| firstSubLayer = sub_layer_cpb_params_present_flag ? 0: hrdMaxTid | |
| for( i = firstSubLayer; i <= hrdMaxTid; i++ ) { | |
| fixed_pic_rate_general_flag[ i ] | u(1) |
| if( !fixed_pic_rate_general_flag[ i ] ) | |
| fixed_pic_rate_within_cvs_flag[ i ] | u(1) |
| if( fixed_pic_rate_within_cvs_flag[ i ] ) | |
| elemental_duration_in_tc_minus1[ i ] | ue(v) |
| else if( hrd_cpb_cnt_minus1 = = 0 ) | |

-continued

| | Descriptor |
|---|---|
| low_delay_hrd_flag[ i ] | u(1) |
| if( general_nal_hrd_params_present_flag ) | |
| sub_layer_hrd_parameters( i ) | |
| if( general_vcl_hrd_params_present_flag ) | |
| sub_layer_hrd_parameters( i ) | |
| } | |
| } | |

The sub-layer HRD parameters syntax includes the following.

| | Descriptor |
|---|---|
| sub_layer_hrd_parameters( subLayerId ) { | |
| for( j = 0; j <= hrd_cpb_cnt_minus1; j++ ) { | |
| bit_rate_value_minus1[ subLayerId ][ j ] | ue(v) |
| cpb_size_value_minus1[ subLayerId ][ j ] | ue(v) |
| if( decoding_unit_hrd_params_present flag ) { | |
| cpb_size_du_value_minus1[ subLayerId ][ j ] | ue(v) |
| bit_rate_du_value_minus1[ subLayerId ][ j ] | ue(v) |
| } | |
| cbr_flag[ subLayerId ][ j ] | u(1) |
| } | |
| } | |

The VPS semantics are as follows.

vps_max_layers_minus1 plus 1 specifies the maximum allowed number of layers in each CVS referring to the VPS.

vps_max_sub_layers_minus1 plus 1 specifies the maximum number of temporal sub-layers that may be present in each CVS referring to the VPS. The value of vps_max_sub_layers_minus1 shall be in the range of 0 to 6, inclusive.

vps_all_layers_same_num_sub_layers_flag equal to 1 specifies that the number of temporal sub-layers is the same for all the layers in each CVS referring to the VPS. vps_all_layers_same_num_sub_layers_flag equal to 0 specifies that the layers in each CVS referring to the VPS may or may not have the same number of temporal sub-layers. When not present, the value of vps_all_layers_same_num_sub_layers_flag is inferred to be equal to 1.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1. When vps_all_independent_layers_flag is equal to 1, the value of vps_independent_layer_flag[i] is inferred to be equal to 1. When vps_all_independent_layers_flag is equal to 0, the value of vps_independent_layer_flag[0] is inferred to be equal to 1.

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to vps_max_layers_minus1, inclusive, it is inferred to be equal to 0.

The variable DirectDependentLayerIdx[i][j], specifying the j-th direct dependent layer of the i-th layer, and the variable LayerUsedAsRefLayerFlag[j], specifying whether the layer with layer index j is used as a reference layer by any other layer, are derived as follows:

```
for( i = 0; i <= vps_max_layers_minus1; i++ )
LayerUsedAsRefLayerFlag[ j ] = 0
for( i = 1; i < vps_max_layers_minus1; i++ )
if( !vps_independent_layer_flag[ i ] )
  for( j = i − 1, k = 0; j >= 0; j− − )
    if( vps_direct_dependency_flag[ i ][ j ] ) {
      DirectDependentLayerIdx[ i ][ k++ ] = j
      LayerUsedAsRefLayerFlag[ j ] = 1
    }
```

The variable GeneralLayerIdx[i], specifying the layer index of the layer with nuh_layer_id equal to vps_layer_id [i], is derived as follows:

```
for( i = 0; i <= vps_max_layers_minus1; i++)
GeneralLayerIdx[ vps_layer_id[ i ] ] = i
```

each_layer_is_an_ols_flag equal to 1 specifies that each output layer set contains only one layer and each layer itself in the bitstream is an output layer set with the single included layer being the only output layer. each_layer_is_an_ols_flag equal to 0 specifies that an output layer set may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output. ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output. ols_mode_idc equal to 2 specifies that the total number of OLSs specified by the VPS is explicitly signaled and for each OLS the highest layer and an explicitly signaled set of lower layers in the OLS are output. The value of ols_mode_idc shall be in the range of 0 to 2, inclusive. The value 3 of ols_mode_idc is reserved for future use by ITU-T|ISO/IEC. When vps_all_independent_layers_flag is equal to 1 and each_layer_is_an_ols_flag is equal to 0, the value of ols_mode_idc is inferred to be equal to 2.

num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

```
if( vps_max_layers_minus1 == 0)
TotalNumOlss = 1
else if( each_layer_is_an_ols_flag
|| ols_mode_idc = = 0 || ols_mode_idc = = 1)
TotalNumOlss = vps_max_layers_minus1 + 1
else if( ols_mode_idc == 2)
TotalNumOlss = num_output_layer_sets_minus1 + 1
```

layer_included_flag[i][j] specifies whether the j-th layer (i.e., the layer with nuh_layer_id equal to vps_layer_id[j]) is included in the i-th OLS when ols_mode_idc is equal to 2. layer_included_flag[i][j] equal to 1 specifies that the j-th layer is included in the i-th OLS. layer_included_flag[i][j] equal to 0 specifies the j-th layer is not included in the i-th OLS.

The variable NumLayersInOls[i], specifying the number of layers in the i-th OLS, and the variable LayerIdInOls[i][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
if( each_layer_is_an_ols_flag ) {
  NumLayersInOls[ i ] = 1
  LayerIdInOls[ i ][ 0 ] = vps_layer_id[ i ]
} else if( ols_mode_ide = = 0 | | ols_mode_idc = = 1 ) {
  NumLayersInOls[ i ] = i + 1
  for( j = 0; j < NumLayersInOls[ i ]; j++ )
    LayerIdInOls[ i ][ j ] = vps_layer_id[ j ]
} else if( ols_mode_idc = = 2 ) {
  for( k = 0, j = 0; k <= vps_max_layers_minus1; k++ )
    if( layer_included_flag[ i ][ k ] )
      LayerIdInOls[ i ][ j++ ] = vps_layer_id[ k ]
  NumLayersInOls[ i ] = j
}
}
```

The variable OlsLayeIdx[i][j], specifying the OLS layer index of the layer with nuh_layer_id equal to LayerIdInOls [i][j], is derived as follows:

```
for( i = 0, i < TotalNumOlss; i++ )
for j = 0; j < NumLayersInOls[ i ]; j++ )
  OlsLayeIdx[ i ][ LayerIdInOls[ i ][ j ] ] = j
```

The lowest layer in each OLS shall be an independent layer. In other words, for each i in the range of 0 to TotalNumOlss−1, inclusive, the value of vps_independent_layer_flag[GeneralLayerIdx[LayerIdInOls[i][0]]] shall be equal to 1.

Each layer shall be included in at least one OLS specified by the VPS. In other words, for each layer with a particular value of nuh_layer_id nuhLayerId, equal to one of vps_layer_id[k] for k in the range of 0 to vps_max_layers_minus1, inclusive, there shall be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

Any layer in an OLS shall be an output layer of the OLS or a (direct or indirect) reference layer of an output layer of the OLS.

vps_output_layer_flag[i][j] specifies whether the j-th layer in the i-th OLS is output when ols_mode_idc is equal to 2. vps_output_layer_flag[i] equal to 1 specifies that the j-th layer in the i-th OLS is output. vps_output_layer_flag[i] equal to 0 specifies that the j-th layer in the i-th OLS is not output. When vps_all_independent_layers_flag is equal to 1 and each_layer_is_an_ols_flag is equal to 0, the value of vps_output_layer_flag[i] is inferred to be equal to 1.

The variable OutputLayerFlag[i][j], for which the value 1 specifies that the j-th layer in the i-th OLS is output and the value 0 specifies that the j-th layer in the i-th OLS is not output, is derived as follows:

-continued

```
for( i = 0, i < TotalNumOlss; i++ ) {
OutputLayerFlag[ i ][ NumLayersInOls[ i ] − 1 ] = 1
for( j = 0; j < NumLayersInOls[ i ] − 1; j++ )
  if( ols_mode_idc[ i ] = = 0 )
    OutputLayerFlag[ i ][ j ] = 0
  else if( ols_mode_idc[ i ] = = 1 )
    OutputLayerFlag[ i ][ j ] = 1
  else if( ols_mode_idc[ i ] = = 2 )
    OutputLayerFlag[ i ][ j ] =
    vps_outpul_layer_flag[ i ][ j ]
}
```

NOTE—The 0-th OLS contains only the lowest layer (i.e., the layer with nuh_layer_id equal to vps_layer_id[0]) and for the 0-th OLS the only included layer is output.

vps_num_ptls specifies the number of profile_tier_level( ) syntax structures in the VPS.

pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( ) syntax structure in the VPS. The value of pt_present_flag[0] is inferred to be equal to 0. When pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS.

ptl_max_temporal_id[i] specifies the TemporalId of the highest sub-layer representation for which the level information is present in the i-th profile_tier_level( ) syntax structure in the VPS. The value of ptl_max_temporal_id[i] shall be in the range of 0 to vps_max_sub_layers_minus1, inclusive. When vps_max_sub_layers_minus1 is equal to 0, the value of ptl_max_temporal_id[i] is inferred to be equal to 0. When vps_max_sub_layers_minus1 is greater than 0 and vps_all_layers_same_num_sub_layers_flag is equal to 1, the value of ptl_max_temporal_id[i] is inferred to be equal to vps_max_sub_layers_minus1.

vps_ptl_byte_alignment_zero_bit shall be equal to 0.

ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] shall be in the range of 0 to vps_num_ptls−1, inclusive.

When NumLayersInOls[i] is equal to 1, the profile_tier_level( ) syntax structure that applies to the i-th OLS is present in the SPS referred to by the layer in the i-th OLS.

vps_num_dpb_params specifies the number of dpb_parameters( ) syntax structures in the VPS. The value of vps_num_dpb_params shall be in the range of 0 to 16, inclusive. When not present, the value of vps_num_dpb_params is inferred to be equal to 0.

same_dpb_size_output_or_nonoutput_flag equal to 1 specifies that there is no layer_nonoutput_dpb_params_idx [i] syntax element present in the VPS. same_dpb_size_output_or_nonoutput_flag equal to 0 specifies that there may or may not be layer_nonoutput_dpb_params_idx[i] syntax elements present in the VPS.

vps_sub_layer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_size_only_flag[i] equal to 1 specifies that the max_num_reorder_pics[ ] and max_latency_increase_plus1[ ] syntax elements are not present in the i-th dpb_parameters( ) syntax structures the VPS. dpb_size_only_flag[i] equal to 1 specifies that the max_num_reorder_pics[ ] and max_latency_increase_plus1[ ] syntax elements may be present in the i-th dpb_parameters( ) syntax structures the VPS.

dpb_max_temporal_id[i] specifies the TemporalId of the highest sub-layer representation for which the DPB parameters may be present in the i-th dpb_parameters( ) syntax structure in the VPS. The value of dpb_max_temporal_id[i] shall be in the range of 0 to vps_max_sub_layers_minus1, inclusive. When vps_max_sub_layers_minus1 is equal to 0, the value of dpb_max_temporal_id[i] is inferred to be equal to 0. When vps_max_sub_layers_minus1 is greater than 0 and vps_all_layers_same_num_sub_layers_flag is equal to 1, the value of dpb_max_temporal_id[i] is inferred to be equal to vps_max_sub_layers_minus1.

layer_output_dpb_params_idx[i] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[i] shall be in the range of 0 to vps_num_dpb_params−1, inclusive.

If vps_independent_layer_flag[i] is equal to 1, the dpb_parameters( ) syntax structure that applies to the i-th layer when it is an output layer is the dpb_parameters( ) syntax structure present in the SPS referred to by the layer.

Otherwise (vps_independent_layer_flag[ i] is equal to 0), the following applies:

When vps_num_dpb_params is equal to 1, the value of layer_output_dpb_params_idx[i] is inferred to be equal to 0.

It is a requirement of bitstream conformance that the value of layer_output_dpb_params_idx[i] shall be such that dpb_size_only_flag[layer_output_dpb_params_idx[i]] is equal to 0.

layer_nonoutput_dpb_params_idx[i] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[i] shall be in the range of 0 to vps_num_dpb_params−1, inclusive.

If same_dpb_size_output_or_nonoutput_flag is equal to 1, the following applies:

If vps_independent_layer_flag[i] is equal to 1, the dpb_parameters( ) syntax structure that applies to the i-th layer when it is a non-output layer is the dpb_parameters( ) syntax structure present in the SPS referred to by the layer.

Otherwise (vps_independent_layer_flag[i] is equal to 0), the value of layer_nonoutput_dpb_params_idx[i] is inferred to be equal to layer_output_dpb_params_idx[i].

Otherwise (same_dpb_size_output_or_nonoutput_flag is equal to 0), when vps_num_dpb_params is equal to 1, the value of layer_output_dpb_params_idx[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification shall ignore all vps_extension_data_flag syntax elements.

The SPS RBSP semantics are as follows.

An SPS RBSP shall be available to the decoding process prior to it being referenced, included in at least one access unit with TemporalId equal to 0 or provided through external means, and the SPS NAL unit containing the SPS RBSP shall have nuh_layer_id equal to the lowest nuh_layer_id value of PPS NAL units that refer to it.

All SPS NAL units with a particular value of sps_seq_parameter_set_id in a CVS shall have the same content.

sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is referred to when decoding each CLVS referring to the SPS, and the value of GeneralLayerIdx[nuh_layer_id] is inferred to be equal to 0, and the value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

sps_max_sub_layers_minus1 plus 1 specifies the maximum number of temporal sub-layers that may be present in each CLVS referring to the SPS. The value of sps_max_sub_layers_minus1 shall be in the range of 0 to vps_max_sub_layers_minus1, inclusive.

sps_reserved_zero_4 bits shall be equal to 0 in bitstreams conforming to this version of this Specification. Other values for sps_reserved_zero_4 bits are reserved for future use by ITU-T|ISO/IEC.

sps_ptl_dpb_present_flag equal to 1 specifies that a profile_tier_level( ) syntax structure and a dpb_parameters( ) syntax structure are present in the SPS. sps_ptl_dpb_present_flag equal to 0 specifies that no profile_tier_level( ) syntax structure and no dpb_parameters( ) syntax structure are present in the SPS. The value of sps_ptl_dpb_present_flag shall be equal to vps_independent_layer_flag[nuh_layer_id].

If vps_independent_layer_flag[GeneralLayerIdx[nuh_layer_id]] is equal to 1, the variable MaxDecPicBuffMinus1 is set equal to max_dec_pic_buffering_minus1[sps_max_sub_layers_minus1] in the dpb_parameters( ) syntax structure in the SPS. Otherwise, Max DecPicBuffMinus1 is set equal to max_dec_pic_buffering_minus1[sps_max_sub_layers_minus1] in the layer_nonoutput_dpb_params_idx[GeneralLayerIdx[nuh_layer_id]]-th dpb_parameters( ) syntax structure in the VPS.

gdr_enabled_flag equal to 1 specifies that gradual decoding refresh (GDR) pictures may be present in CLVSs referring to the SPS. gdr_enabled_flag equal to 0 specifies that GDR pictures are not present in CLVSs referring to the SPS.

sps_sub_layer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, sps_sub_dpb_params_info_present_flag is inferred to be equal to 0.

long_term_ref_pics_flag equal to 0 specifies that no LTRP is used for inter prediction of any coded picture in the CLVS.

long_term_ref_pics_flag equal to 1 specifies that LTRPs may be used for inter prediction of one or more coded pictures in the CLVS.

The general profile, tier, and level semantics are as follows.

A profile_tier_level( ) syntax structure provides level information and, optionally, profile, tier, sub-profile, and general constraints information (denoted as PT information).

When the profile_tier_level( ) syntax structure is included in a DPS, the OlsInScope is the OLS that includes all layers in the entire bitstream that refers to the DPS. When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, which shall be an independent layer.

general_profile_idc indicates a profile to which OlsInScope conforms as specified in Annex A of the VVC standard. Bitstreams shall not contain values of general_profile_idc other than those specified in Annex A. Other values of general_profile_idc are reserved for future use by ITU-T|ISO/IEC.

general_tier_flag specifies the tier context for the interpretation of general_level_idc as specified in Annex A.

num_sub_profiles specifies the number of the general_sub_profile_idc[i] syntax elements.

general_sub_profile_idc[i] indicates the i-th interoperability metadata registered as specified by Recommendation ITU-T T.35, the contents of which are not specified in the VVC standard.

general_level_idc indicates a level to which OlsInScope conforms as specified in Annex A. Bitstreams shall not contain values of general_level_idc other than those specified in Annex A. Other values of general_level_idc are reserved for future use by ITU-T|ISO/IEC.

NOTE 1—A greater value of general_level_idc indicates a higher level. The maximum level signaled in the DPS for OlsInScope may be higher than the level signaled in the SPS for a CVS contained within OlsInScope.

NOTE 2—When OlsInScope conforms to multiple profiles, general_profile_idc should indicate the profile that provides the preferred decoded result or the preferred bitstream identification, as determined by the encoder (in a manner not specified in this Specification).

NOTE 3—When the profile_tier_level( ) syntax structure included in a DPS and CVSs of OlsInScope conform to different profiles, general_profile_idc and level_idc should indicate the profile and level for a decoder that is capable of decoding OlsInScope.

sub_layer_level_present_flag[i] equal to 1 specifies that level information is present in the profile_tier_level( ) syntax structure for the sub-layer representation with TemporalId equal to i. sub_layer_level_present_flag[i] equal to 0 specifies that level information is not present in the profile_tier_level( ) syntax structure for the sub-layer representation with TemporalId equal to i.

ptl_alignment_zero_bits shall be equal to 0.

The semantics of the syntax element sub_layer_level_idc [i] is, apart from the specification of the inference of not present values, the same as the syntax element general_level_idc, but applies to the sub-layer representation with TemporalId equal to i.

The DPB semantics are as follows.

The dpb_parameters (maxSubLayersMinus1, subLayerInfoFlag) syntax structure provides information of DPB size, maximum picture reorder number, and maximum latency for each CLVS of the CVS.

When a dpb_parameters( ) syntax structure is included in a VPS, the OLSs to which the dpb_parameters( ) syntax structure applies are specified by the VPS. When a dpb_parameters( ) syntax structure is included in an SPS, it applies to the OLS that includes only the layer that is the lowest layer among the layers that refer to the SPS, which shall be an independent layer.

max_dec_pic_buffering_minus1[i] plus 1 specifies, for each CLVS of the CVS, the maximum required size of the decoded picture buffer in units of picture storage buffers when Htid is equal to i. The value of max_dec_pic_buffering_minus1[i] shall be in the range of 0 to MaxDpbSize−1, inclusive, where MaxDpbSize is as specified somewhere else. When i is greater than 0, max_dec_pic_buffering_minus1[i] shall be greater than or equal to max_dec_pic_buffering_minus1[i−1]. When max_dec_pic_buffering_minus1 [i] is not present for i in the range of 0 to maxSubLayersMinus1−1, inclusive, due to subLayerInfoFlag being equal to 0, it is inferred to be equal to max_dec_pic_buffering_minus1[max SubLayersMinus1].

max_num_reorder_pics[i] specifies, for each CLVS of the CVS, the maximum allowed number of pictures of the CLVS that can precede any picture in the CLVS in decoding order and follow that picture in output order when Htid is equal to i. The value of max_num_reorder_pics[i] shall be in the range of 0 to max_dec_pic_buffering_minus1[i], inclusive. When i is greater than 0, max_num_reorder_pics[i] shall be greater than or equal to max_num_reorder_pics[i−1]. When max_num_reorder_pics[i] is not present for i in the range of 0 to maxSubLayersMinus1−1, inclusive, due to subLayerInfoFlag being equal to 0, it is inferred to be equal to max_num_reorder_pics[max SubLayersMinus1].

max_latency_increase_plus1[i] not equal to 0 is used to compute the value of MaxLatencyPictures[i], which specifies, for each CLVS of the CVS, the maximum number of pictures in the CLVS that can precede any picture in the CLVS in output order and follow that picture in decoding order when Htid is equal to i.

When max_latency_increase_plus1[i] is not equal to 0, the value of MaxLatencyPictures[i] is specified as follows:

$$MaxLatencyPictures[i] = \text{max\_num\_reorder\_pics}[i] + \text{max\_latency\_increase\_plus1}[i] - 1$$

When max_latency_increase_plus1[i] is equal to 0, no corresponding limit is expressed.

The value of max_latency_increase_plus1[i] shall be in the range of 0 to 232-2, inclusive. When max_latency_increase_plus1[i] is not present for i in the range of 0 to maxSubLayersMinus1−1, inclusive, due to subLayerInfoFlag being equal to 0, it is inferred to be equal to max_latency_increase_plus1[maxSubLayersMinus1].

The HRD parameters semantics include general HRD parameters semantics.

The general HRD parameters semantics are as follows.

The general_hrd_parameters( ) syntax structure provides HRD parameters used in the HRD operations.

num_ols_hrd_params_minus1 plus 1 specifies the number of ols_hrd_parameters( ) syntax structures present in the general_hrd_parameters( ) syntax structure. The value of num_ols_hrd_params_minus1 shall be in the range of 0 to 63, inclusive. When TotalNumOlss is greater than 1, the value of num_ols_hrd_params_minus1 is inferred to be equal to 0.

hrd_cpb_cnt_minus1 plus 1 specifies the number of alternative CPB specifications in the bitstream of the CVS. The value of hrd_cpb_cnt_minus1 shall be in the range of 0 to 31, inclusive.

hrd_max_temporal_id[i] specifies the TemporalId of the highest sub-layer representation for which the HRD parameters are contained in the i-th layer_level_hrd_parameters( ) syntax structure. The value of hrd_max_temporal_id[i] shall be in the range of 0 to vps_max_sub_layers_minus1, inclusive. When vps_max_sub_layers_minus1 is equal to 0, the value of hrd_max_temporal_id[i] is inferred to be equal to 0.

ols_hrd_idx[i] specifies the index of the ols_hrd_parameters( ) syntax structure that applies to the i-th OLS. The value of ols_hrd_idx[i] shall be in the range of 0 to num_ols_hrd_params_minus1, inclusive. When not present, the value of ols_hrd_idx[i] is inferred to be equal to 0.

The reference picture list structure semantics are as follows.

The ref_pic_list_struct(listIdx, rplsIdx) syntax structure may be present in an SPS or in a slice header. Depending on whether the syntax structure is included in a slice header or an SPS, the following applies:

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct (listIdx, rplsIdx) syntax structures included in the SPS, and 2) is in a CVS that refers to the SPS.

num_ref_entries[listIdx][rplsIdx] specifies the number of entries in the ref_pic_list_struct (listIdx, rplsIdx) syntax structure. The value of num_ref_entries[listIdx][rplsIdx] shall be in the range of 0 to MaxDecPicBuffMinus1+14, inclusive.

The VPS 704, the SPS 706, and the PPS 708 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the VPS 704 is contained in a non-VCL NAL unit designated as a VPS NAL unit. Therefore, the VPS NAL unit has a VPS NUT. In an embodiment, the SPS 706 is a non-VCL NAL unit designated as a SPS NAL unit. Therefore, the SPS NAL unit has an SPS NUT. In an embodiment, the PPS 708 is contained in a non-VCL NAL unit designated as a PPS NAL unit. Therefore, the PPS NAL unit has a PPS NUT.

The slice header 712 is a syntax structure containing syntax elements that apply to all slices of a coded picture (e.g., picture 725). In an embodiment, the slice header 712 is in a VCL NAL.

The image data 720 contains video data encoded according to inter-prediction, intra-prediction, or inter-layer prediction, as well as corresponding transformed and quantized residual data. As shown in FIG. 7, the image data 720 includes one or more OLSs 721. The one or more OLSs 721 are similar to OLS 1, OLS 2, and OLS 3 of FIG. 6. Each OLS 721 includes one or more layers 723. The layers 723 are similar to the layers 631-635 in FIG. 6. Each of the layers 723 includes one or more pictures 725. The pictures 725 are similar to the pictures 615-618, 611-614, 641-644, 651-654, and 661-664 in FIG. 6.

Each picture 725 is an array of luma samples in monochrome format or an array of luma samples and two corresponding arrays of chroma samples in 4:2:0, 4:2:2, and 4:4:4 colour format. The pictures 725 may be either a frame or a field. However, in one CVS (e.g., CVS 690), either all pictures 725 are frames or all pictures 725 are fields. The CVS 690 is a coded video sequence for every coded layer video sequence (CLVS) in the video bitstream 600. Notably, the CVS 690 and the CLVS are the same when the video bitstream 600 includes a single layer. The CVS 690 and the CLVS are only different when the video bitstream 600 includes multiple layers (e.g., as shown in FIGS. 5 and 6).

Each picture 725 contains one or more slices 727. A slice 727 is an integer number of complete tiles or an integer number of consecutive complete CTU rows within a tile of a picture (e.g., picture 725). Each slice 727 is exclusively contained in a single NAL unit (e.g., a VCL NAL unit). A tile (not shown) is a rectangular region of CTUs within a particular tile column and a particular tile row in a picture (e.g., picture 725). A CTU (not shown) is a CTB of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

The pictures 725 and their slices 727 comprise data associated with the images or video being encoded or decoded. Thus, the pictures 725 and their slices 727 may be simply referred to as the payload or data being carried in the bitstream 700.

Those skilled in the art will appreciate that the bitstream 700 may contain other parameters and information in practical applications.

A sub-bitstream 701 can be extracted from the bitstream 700 according to a sub-bitstream extraction process 703. A sub-bitstream extraction process 703 is a specified mechanism that removes NAL units from a bitstream 700 that are not a part of a target set resulting in an output sub-bitstream 701 that includes the NAL units that are included in the target set. The sub-bitstream extraction process 703 may be performed by an encoder or an associated slicer configured to dynamically alter a bitstream 700 based on user behavior/requests.

Because the SPS 706 contains the profile_tier_level( ) for the i-th OLS 784 when the i-th OLS contains only a single layer (e.g., OLS 3 in FIG. 6), the VPS 704 can be removed during the extraction process 703. That is, the sub-bitstream 701 does not need to include the VPS 704 in the sub-bitstream 701 because the identical profile_tier_level( ) for the i-th OLS 784 is also present in the SPS 706. Therefore, the decoder may obtain the profile_tier_level( ) for the i-th OLS 784 from the SPS 706 when the i-th OLS contains only a single layer.

Figure 8:
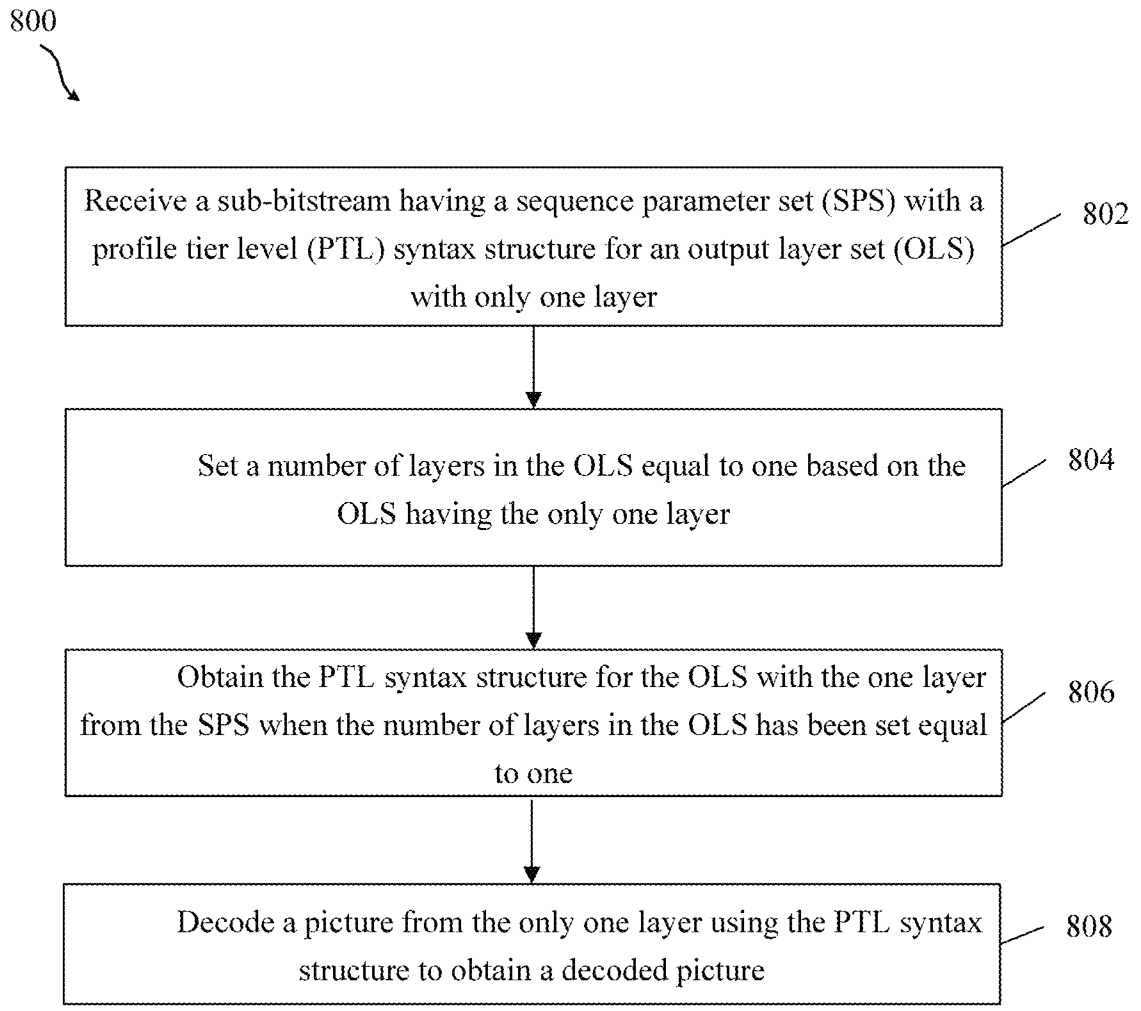
FIG. 8 is an embodiment of a method of decoding a coded video bitstream.

FIG. 8 is an embodiment of a method 800 of decoding implemented by a video decoder (e.g., video decoder 400). The method 800 may be performed after a bitstream has been directly or indirectly received from a video encoder (e.g., video encoder 300). The method 800 improves the decoding process by ensuring the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

In block 802, the video decoder receives a sub-bitstream (e.g., sub-bitstream 701) having a sequence parameter set (e.g., SPS 706) with a profile tier level (PTL) syntax structure (e.g., profile_tier_level( ) for i-th OLS 784) for an output layer set (OLS) with only one layer (e.g., OLS 3).

In an embodiment, the PTL syntax structure is designated profile_tier_level( ) In an embodiment, the only one layer is the i-th layer, and wherein the OLS is the i-th OLS. In an embodiment, the PTL syntax structure is present in an i-th profile_tier_level( ) syntax structure in the SPS. In an embodiment, the sub-bitstream does not include a video parameter set (VPS 704). That is, the VPS has been removed as part of the extraction process 703.

In block 804, the video decoder sets a number of layers in the OLS equal to one based on the OLS having the only one layer. In an embodiment, the number of layers in the OLS is a variable designated NumLayersInOls[i]. In an embodiment, the variable designated NumLayersInOls[i] is derived by the video decoder. That is, the variable designated NumLayersInOls[i] is not signaled in the sub-bitstream 701.

In block 806, the video decoder obtains the PTL syntax structure for the OLS with the one layer from the SPS when the number of layers in the OLS has been set equal to one. In an embodiment, the SPS is referred to by the only one layer in the OLS.

In block 808, the video decoder decodes a picture (e.g., picture 725) from the only one layer using the PTL syntax structure to obtain a decoded picture.

Once the picture has been decoded, the picture may be used to generate or produce an image or video sequence for display to a user on the display or screen of an electronic device (e.g., a smart phone, tablet, laptop, personal computer, etc.).

Figure 9:
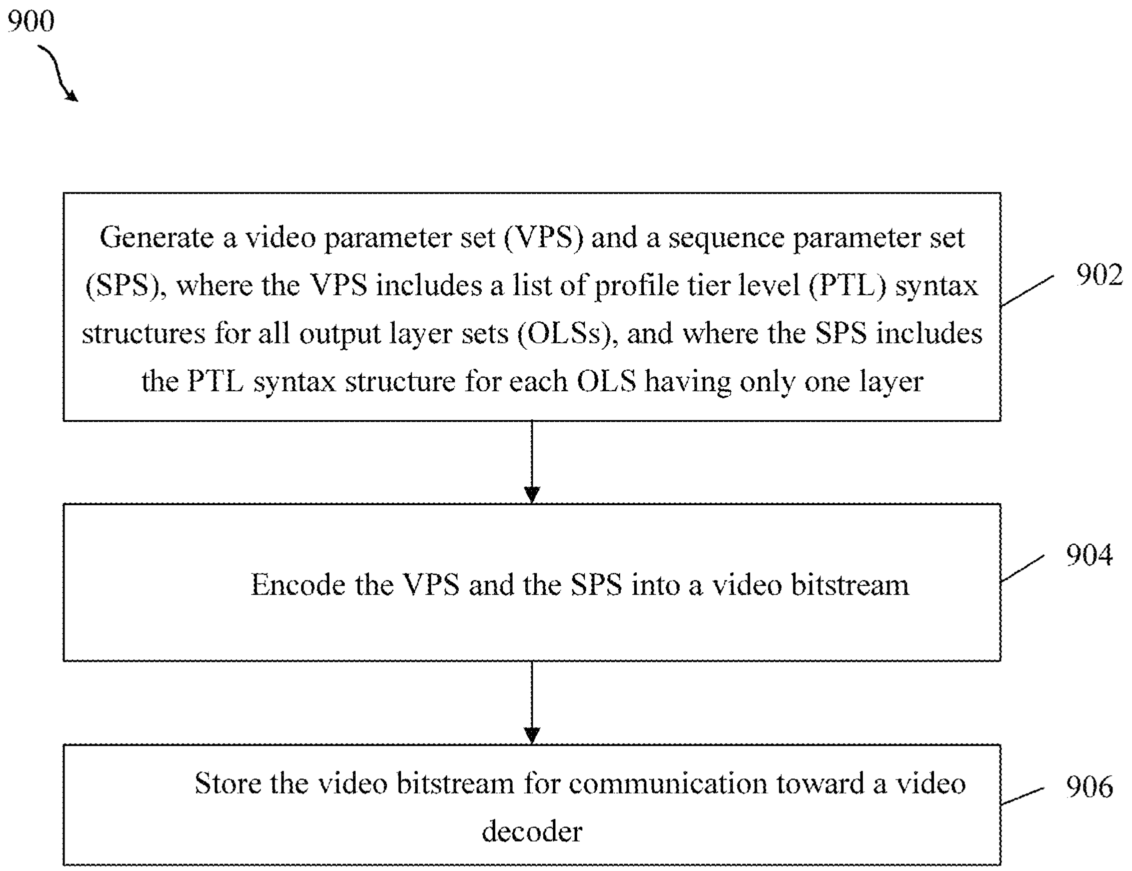
FIG. 9 is an embodiment of a method of encoding a coded video bitstream.

FIG. 9 is an embodiment of a method 900 of encoding a video bitstream implemented by a video encoder (e.g., video encoder 300). The method 900 may be performed when a picture (e.g., from a video) is to be encoded into a video bitstream and then transmitted toward a video decoder (e.g., video decoder 400). The method 900 improves the encoding process by ensuring the profile, tier, and level (PTL) parameters are included in a sequence parameter set (SPS) when an output layer set (OLS) contains only a single layer. Because the SPS includes the PTL parameters for the OLS with the single layer, a video parameter set (VPS) may be removed from the bitstream, which reduces redundancy and increases coding efficiency. Thus, the coder/decoder (a.k.a., "codec") in video coding is improved relative to current codecs. As a practical matter, the improved video coding process offers the user a better user experience when videos are sent, received, and/or viewed.

In block 902, the video encoder generates a video parameter set (e.g., VPS 704) and a sequence parameter set (e.g., SPS 706). The VPS includes a list of profile tier level (PTL) syntax structures for all output layer sets (e.g., PTL syntax structures 780). The SPS includes the PTL syntax structure for each OLS having only one layer (e.g., profile_tier_level for i-th OLS 784). For example, the SPS includes the PTL syntax structure for OLS 3 in FIG. 6, which is designated profile_tier_level( ) for OLS3 in FIG. 7. The SPS does not include the PTL syntax structure for any OLS having more than one layer. For example, the SPS does not include the PTL syntax structure for OLS 1 and OLS 2 in FIG. 6, which are designated profile_tier_level( ) for OLS2 and profile_tier_level( ) for OLS3 in FIG. 7.

In an embodiment, the VPS includes an index to the list of PTL syntax structures, and wherein the index is designated vps_ols_ptl_idx[i]. In an embodiment, a value of vps_ols_ptl_idx[i] is in a range of zero to a total number of the PTL syntax structures in the VPS. In an embodiment, the VPS includes vps_num_ptls_minus1, and wherein vps_num_ptls_minus1 plus 1 specifies the total number of the PTL syntax structures.

In block 904, the video encoder encodes the VPS and the SPS into a video bitstream. In block 906, the video encoder stores the video bitstream for communication toward a video decoder. In an embodiment, the method 900 further includes extracting a sub-bitstream (e.g., sub-bitstream 701) from the bitstream (e.g., bitstream 700). As described above, the extraction process 703 retains the SPS but removes the VPS. That is, the sub-bitstream includes the SPS from the bitstream but does not include the VPS from the bitstream.

Like the video bitstream, the sub-bitstream may be stored in memory for communication toward a video decoder. In an embodiment, the video bitstream and/or the sub-bitstream is transmitted toward the video decoder. Once received by the video decoder, the encoded video bitstream and/or the encoded sub-bitstream may be decoded (e.g., as described above) to generate or produce an image or video sequence for display to a user on the display or screen of an electronic device (e.g., a smart phone, tablet, laptop, personal computer, etc.).

Additional and/or supplemental details are provided below.

The general decoding process is as follows.

Input to this process is a bitstream BitstreamToDecode. Output of this process is a list of decoded pictures.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of the VVC standard.

For each IRAP AU in the bitstream, the following applies.

If the AU is the first AU in the bitstream in decoding order, each picture is an instantaneous decoding refresh (IDR) picture, or each picture is the first picture of the layer that follows an end of sequence NAL unit in decoding order, the variable NoIncorrectPicOutputFlag is set equal to 1.

Otherwise, if some external means not specified in this Specification is available to set the variable HandleCraAsCvsStartFlag to a value for the AU, HandleCraAsCvsStartFlag is set equal to the value provided by the external means and NoIncorrectPicOutputFlag is set equal to HandleCraAsCvsStartFlag.

Otherwise, HandleCraAsCvsStartFlag and NoIncorrectPicOutputFlag are both set equal to 0.

For each GDR AU in the bitstream, the following applies.

If the AU is the first AU in the bitstream in decoding order or each picture is the first picture of the layer that follows an end of sequence NAL unit in decoding order, the variable NoIncorrectPicOutputFlag is set equal to 1.

Otherwise, if some external means not specified in this Specification is available to set the variable HandleGdrAsCvsStartFlag to a value for the AU, HandleGdrAsCvsStartFlag is set equal to the value provided by the external means and NoIncorrectPicOutputFlag is set equal to HandleGdrAsCvsStartFlag.

Otherwise, HandleGdrAsCvsStartFlag and NoIncorrectPicOutputFlag are both set equal to 0.

NOTE—The above operations, for both IRAP pictures and GDR pictures, are needed for identification of the CVSs in the bitstream.

Clause 8.1.2 is repeatedly invoked for each coded picture in BitstreamToDecode in decoding order.

The decoding process for reference picture lists construction is as follows.

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

It is a requirement of bitstream conformance that the following constraints apply.

For each i equal to 0 or 1, num_ref_entries[i][RplsIdx[ i]] shall not be less than NumRefIdxActive[i].

The picture referred to by each active entry in RefPicList [0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

A short-term reference picture (STRP) entry in RefPicList [0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to 224.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDecPicBuffMinus1 and setOfRefPics shall be the same for all slices of a picture.

When the current picture is a Step-wise Temporal Sublayer Access (STSA) picture, there shall be no active entry in RefPicList[0] or RefPicList[1] that has TemporalId equal to that of the current picture.

When the current picture is a picture that follows, in decoding order, an STSA picture that has TemporalId equal to that of the current picture, there shall be no picture that has TemporalId equal to that of the current picture included as an active entry in RefPicList[0] or RefPicList[1] that precedes the STSA picture in decoding order.

The picture referred to by each ILRP entry in RefPicList [0] or RefPicList[1] of a slice of the current picture shall be in the same access unit as the current picture.

The picture referred to by each ILRP entry in RefPicList [0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

The HRD general aspects in clause C.1 of the VVC standard include the following.

This annex specifies the hypothetical reference decoder (HRD) and its use to check bitstream and decoder conformance.

A set of bitstream conformance tests is needed for checking the conformance of a bitstream, which is referred to as the entire bitstream, denoted as entireBitstream. The set of bitstream conformance tests are for testing the conformance of each OP of each OLS specified by the VPS.

For each test, the following ordered steps apply in the order listed, followed by the processes described after these steps in this clause:

1. An operation point under test, denoted as targetOp, is selected by selecting a target OLS with OLS index opOlsIdx and a highest TemporalId value opTid. The value of opOlsIdx is in the range of 0 to TotalNumOlss−1, inclusive. The value of opTid is in the range of 0 to vps_max_sub_layers_minus1, inclusive. Each pair of selected values of opOlsIdx and opTid shall be such that the sub-bitstream that is the output by invoking the sub-bitstream extraction process as specified in clause C.6 with entireBitstream, opOlsIdx, and opTid as inputs satisfy the following conditions:
   There is at least one VCL NAL unit with nuh_layer_id equal to each of the nuh_layer_id values in LayerIdInOls[opOlsIdx] in BitstreamToDecode.
   There is at least one VCL NAL unit with TemporalId equal to opTid in BitstreamToDecode.
2. If the layers in targetOp include all layers in entireBitstream and opTid is equal to greater than the highest TemporalId value among all NAL units in entireBitstream, BitstreamToDecode is set to be identical to entireBitstream. Otherwise, BitstreamToDecode is set to be the output by invoking the sub-bitstream extraction process as specified in clause C.6 with entireBitstream, opOlsIdx, and opTid as inputs.
3. The values of TargetOlsIdx and Htid are set equal to opOlsIdx and opTid, respectively, of targetOp.
4. A value of ScIdx is selected. The selected ScIdx shall be in the range of 0 to hrd_cpb_cnt_minus1, inclusive.
5. An access unit in BitstreamToDecode associated with buffering period SEI messages (present in TargetLayerBitstream or available through external means not specified in this Specification) applicable to TargetOlsIdx is selected as the HRD initialization point and referred to as access unit 0 for each layer in the target OLS.

6. The ols_hrd_parameters( ) syntax structure and the sub_layer_hrd_parameters( ) syntax structure applicable to BitstreamToDecode are selected as follows:
   The ols_hrd_idx[TargetOlsIdx]-th ols_hrd_parameters( ) syntax structure in the VPS (or provided through an external means not specified in this Specification) is selected.
   Within the selected ols_hrd_parameters( ) syntax structure, if BitstreamToDecode is a Type I bitstream, the sub_layer_hrd_parameters (Htid) syntax structure that immediately follows the condition "if (general_vcl_hrd_params_present_flag)" is selected and the variable NalHrdModeFlag is set equal to 0; otherwise (BitstreamToDecode is a Type II bitstream), the sub_layer_hrd_parameters (Htid) syntax structure that immediately follows either the condition "if (general_vcl_hrd_params_present_flag)" (in this case the variable NalHrdModeFlag is set equal to 0) or the condition "if (general_nal_hrd_params_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8 bits, zero_byte, start_code_prefix_one_3 bytes and trailing_zero_8 bits syntax elements that form a byte stream from the NAL unit stream (as specified in Annex B), when present, are discarded from BitstreamToDecode and the remaining bitstream is assigned to BitstreamToDecode.
7. When decoding_unit_hrd_params_present_flag is equal to 1, the CPB is scheduled to operate either at the access unit level (in which case the variable DecodingUnitHrdFlag is set equal to 0) or at the decoding unit level (in which case the variable DecodingUnitHrdFlag is set equal to 1). Otherwise, DecodingUnitHrdFlag is set equal to 0 and the CPB is scheduled to operate at the access unit level.
8. For each access unit in BitstreamToDecode starting from access unit 0, the buffering period SEI message (present in BitstreamToDecode or available through external means not specified in this Specification) that is associated with the access unit and applies to TargetOlsIdx is selected, the picture timing SEI message (present in BitstreamToDecode or available through external means not specified in this Specification) that is associated with the access unit and applies to TargetOlsIdx is selected, and when DecodingUnitHrdFlag is equal to 1 and decoding_unit_cpb_params_in_pic_timing_sei_flag is equal to 0, the decoding unit information SEI messages (present in BitstreamToDecode or available through external means not specified in this Specification) that are associated with decoding units in the access unit and apply to TargetOlsIdx are selected.

Each conformance test consists of a combination of one option in each of the above steps. When there is more than one option for a step, for any particular conformance test only one option is chosen. All possible combinations of all the steps form the entire set of conformance tests. For each operation point under test, the number of bitstream conformance tests to be performed is equal to n0*n1*n2*n3, where the values of n0, n1, n2, and n3 are specified as follows:

n1 is equal to hrd_cpb_cnt_minus1+1.

n1 is the number of access units in BitstreamToDecode that are associated with buffering period SEI messages.

n2 is derived as follows:

If BitstreamToDecode is a Type I bitstream, n0 is equal to 1.

Otherwise (BitstreamToDecode is a Type II bitstream), n0 is equal to 2.

n3 is derived as follows:

If decoding_unit_hrd_params_present_flag is equal to 0, n3 is equal to 1.

Otherwise, n3 is equal to 2.

The HRD contains a bitstream extractor (optionally present), a coded picture buffer (CPB), an instantaneous decoding process, a decoded picture buffer (DPB) that conceptually contains a sub-DPB for each layer, and output cropping.

For each bitstream conformance test, the CPB size (number of bits) is CpbSize[Htid][ScIdx] as specified in clause 7.4.5.2, where ScIdx and the HRD parameters are specified above in this clause, and DPB parameters max_dec_pic_buffering_minus1[Htid], max_num_reorder_pics [Htid], and MaxLatencyPictures[Htid] for each layer are found in or derived from the dpb_parameters( ) syntax structure that applies to the layer depending on whether the layer is an independent layer and whether the layer is an output layer of the target OLS.

The HRD operates as follows.

The HRD is initialized at decoding unit 0, with both the CPB and each sub-DPB of the DPB being set to be empty (the sub-DPB fullness for each sub-DPB is set equal to 0).

NOTE—After initialization, the HRD is not initialized again by subsequent buffering period SEI messages.

Data associated with decoding units that flow into each CPB according to a specified arrival schedule are delivered by the hypothetical stream scheduler (HSS).

The data associated with each decoding unit are removed and decoded instantaneously by the instantaneous decoding process at the CPB removal time of the decoding unit.

Each decoded picture is placed in the DPB.

A decoded picture is removed from the DPB when it becomes no longer needed for inter prediction reference and no longer needed for output.

The operation of the decoded picture buffer is provided.

The specifications in this clause apply independently to each set of decoded picture buffer (DPB) parameters selected as specified in clause C.1.

The decoded picture buffer conceptually consists of sub-DPBs and each sub-DPB contains picture storage buffers for storage of decoded pictures of one layer. Each of the picture storage buffers may contain a decoded picture that is marked as "used for reference" or is held for future output. The processes specified in clauses C3.2, C3.3, and C3.4 are sequentially applied as specified below, and are applied independently for each layer, starting from the lowest layer in the OLS, in increasing order of nuh_layer_id values of the layers in the OLS. When these processes are applied for a particular layer, only the sub-DPB for the particular layer is affected. In the descriptions of these processes, the DPB refers to the sub-DPB for the particular layer, and the particular layer is referred to as the current layer.

NOTE—In the operation of output timing DPB, decoded pictures with PicOutputFlag equal to 1 in the same access unit are output consecutively in ascending order of the nuh_layer_id values of the decoded pictures.

Let picture n and the current picture be the coded picture or decoded picture of the access unit n for a particular value of nuh_layer_id, wherein n is a non-negative integer number.

The removal of pictures from the DPB before decoding the current picture is described.

The removal of pictures from the DPB before decoding of the current picture (but after parsing the slice header of the first slice of the current picture) happens instantaneously at the CPB removal time of the first decoding unit of access unit n (containing the current picture) and proceeds as follows:

The decoding process for reference picture list construction as specified in clause 8.3.2 is invoked and the decoding process for reference picture marking as specified in clause 8.3.3 is invoked.

When the current AU is a CVSS AU that is not AU 0, the following ordered steps are applied:

1. The variable NoOutputOfPriorPicsFlag is derived for the decoder under test as follows:

If the value of pic_width_max_in_luma_samples, pic_height_max_in_luma_samples, chroma_format_idc, separate_colour_plane_flag, bit_depth_luma_minus8, bit_depth_chroma_minus8 or max_dec_pic_buffering_minus1[Htid] derived for any picture in the current AU is different from the value of pic_width_in_luma_samples, pic_height_in_luma_samples, chroma_format_idc, separate_colour_plane_flag, bit_depth_luma_minus8, bit_depth_chroma_minus8 or max_dec_pic_buffering_minus1[Htid], respectively, derived for the preceding picture in the same CLVS, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, NoOutputOfPriorPicsFlag is set equal to no_output_of_prior_pics_flag.

2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.

When both of the following conditions are true for any pictures k in the DPB, all such pictures k in the DPB are removed from the DPB:

picture k is marked as "unused for reference".

picture k has PictureOutputFlag equal to 0 or its DPB output time is less than or equal to the CPB removal time of the first decoding unit (denoted as decoding unit m) of the current picture n; i.e., DpbOutputTime[k] is less than or equal to DuCpbRemovalTime[m].

For each picture that is removed from the DPB, the DPB fullness is decremented by one.

The operation of the output order DPB is described.

The specifications in this clause apply independently to each set of decoded picture buffer (DPB) parameters selected as specified in clause C.1.

The decoded picture buffer conceptually consists of sub-DPBs and each sub-DPB contains picture storage buffers for storage of decoded pictures of one layer. Each of the picture storage buffers contains a decoded picture that is marked as "used for reference" or is held for future output.

The process for output and removal of pictures from the DPB before decoding of the current picture as specified in clause C.5.2.2 is invoked, followed by the invocation of the process for current decoded picture marking and storage as specified in clause C.3.4, and finally followed by the invocation of the process for additional bumping as specified in clause C.5.2.3. The "bumping" process is specified in clause C.5.2.4 and is invoked as specified in clauses C.5.2.2 and C.5.2.3.

These processes are applied independently for each layer, starting from the lowest layer in the OLS, in increasing order of the nuh_layer_id values of the layers in the OLS. When these processes are applied for a particular layer, only the sub-DPB for the particular layer is affected.

NOTE—In the operation of output order DPB, same as in the operation of output timing DPB, decoded pictures with PicOutputFlag equal to 1 in the same access unit are also output consecutively in ascending order of the nuh_layer_id values of the decoded pictures.

Let picture n and the current picture be the coded picture or decoded picture of the access unit n for a particular value of nuh_layer_id, wherein n is a non-negative integer number.

The output and removal of pictures from the DPB is described.

The output and removal of pictures from the DPB before the decoding of the current picture (but after parsing the slice header of the first slice of the current picture) happens instantaneously when the first decoding unit of the access unit containing the current picture is removed from the CPB and proceeds as follows:

The decoding process for reference picture list construction as specified in clause 8.3.2 and decoding process for reference picture marking as specified in clause 8.3.3 are invoked.

If the current AU is a CVSS AU that is not AU0, the following ordered steps are applied:

1. The variable NoOutputOfPriorPicsFlag is derived for the decoder under test as follows:

If the value of pic_width_max_in_luma_samples, pic_height_max_in_luma_samples, chroma_format_idc, separate_colour_plane_flag, bit_depth_luma_minus8, bit_depth_chroma_minus8 or max_dec_pic_buffering_minus1[Htid] derived for any picture of the current AU is different from the value of pic_width_in_luma_samples, pic_height_in_luma_samples, chroma_format_idc, separate_colour_plane_flag, bit_depth_luma_minus8, bit_depth_chroma_minus8 or max_dec_pic_buffering_minus1[Htid], respectively, derived for the preceding picture in the same CLVS, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, NoOutputOfPriorPicsFlag is set equal to no_output_of_prior_pics_flag.

2. The value of NoOutputOfPriorPicsFlag derived for the decoder under test is applied for the HRD as follows:

If NoOutputOfPriorPicsFlag is equal to 1, all picture storage buffers in the DPB are emptied without output of the pictures they contain and the DPB fullness is set equal to 0.

Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.

Otherwise (the current picture is not a CLVSS picture), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:

The number of pictures in the DPB that are marked as "needed for output" is greater than max_num_reorder_pics [Htid].

max_latency_increase_plus1[Htid] is not equal to 0 and there is at least one picture in the DPB that is marked as "needed for output" for which the associated variable PicLatencyCount is greater than or equal to MaxLatencyPictures [Htid].

The number of pictures in the DPB is greater than or equal to max_dec_pic_buffering_minus1[Htid]+1.

Additional bumping is described.

The processes specified in this clause happen instantaneously when the last decoding unit of access unit n containing the current picture is removed from the CPB.

When the current picture has PictureOutputFlag equal to 1, for each picture in the DPB that is marked as "needed for output" and follows the current picture in output order, the associated variable PicLatencyCount is set equal to PicLatencyCount+1.

The following applies:

If the current decoded picture has PictureOutputFlag equal to 1, it is marked as "needed for output" and its associated variable PicLatencyCount is set equal to 0.

Otherwise (the current decoded picture has PictureOutputFlag equal to 0), it is marked as "not needed for output".

When one or more of the following conditions are true, the "bumping" process specified in clause C.5.2.4 is invoked repeatedly until none of the following conditions are true:

The number of pictures in the DPB that are marked as "needed for output" is greater than max_num_reorder_pics[Htid].

max_latency_increase_plus1[Htid] is not equal to 0 and there is at least one picture in the DPB that is marked as "needed for output" for which the associated variable PicLatencyCount that is greater than or equal to MaxLatencyPictures[Htid].

The bumping process is described.

The "bumping" process consists of the following ordered steps:

The picture or pictures that are first for output are selected as the one having the smallest value of PicOrderCntVal of all pictures in the DPB marked as "needed for output".

Each of these pictures, in ascending nuh_layer_id order, is cropped, using the conformance cropping window for the picture, the cropped picture is output, and the picture is marked as "not needed for output".

Each picture storage buffer that contains a picture marked as "unused for reference" and that was one of the pictures cropped and output is emptied and the fullness of the associated sub-DPB is decremented by one.

NOTE—For any two pictures picA and picB that belong to the same CVS and are output by the "bumping process", when picA is output earlier than picB, the value of PicOrderCntVal of picA is less than the value of PicOrderCntVal of picB.

The sub-bitstream extraction process is described.

Inputs to this process are a bitstream inBitstream, a target OLS index targetOlsIdx, and a target highest TemporalId value tIdTarget.

Output of this process is a sub-bitstream outBitstream.

It is a requirement of bitstream conformance for the input bitstream that any output sub-bitstream that is the output of the process specified in this clause with the bitstream, targetOlsIdx equal to an index to the list of OLSs specified by the VPS, and tIdTarget equal to any value in the range of 0 to 6, inclusive, as inputs, and that satisfies the following conditions shall be a conforming bitstream:

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream OutBitstream is derived as follows:

The bitstream outBitstream is set to be identical to the bitstream inBitstream.

Remove from outBitstream all NAL units with TemporalId greater than tIdTarget.

Remove from outBitstream all NAL units with nuh_layer_id not included in the list LayerIdInOls[targetOlsIdx].

Remove from outBitstream all SEI NAL units that contain a scalable nesting SEI message that has nesting_ols_flag equal to 1 and there is no value of i in the range of 0 to nesting_num_olss_minus1, inclusive, such that NestingOlsIdx[i] is equal to targetOlsIdx.

When targetOlsIdx is greater than 0, remove from outBitstream all SEI NAL units that contain a non-scalable-nested SEI message with payloadType equal to 0 (buffering period), 1 (picture timing), or 130 (decoding unit information).

Scalable nesting SEI message syntax is provided.

| | Descriptor |
|---|---|
| scalable_nesting( payloadSize ) { | |
|   nesting_ols_flag | u(1) |
|   if( nesting_ols_flag ) { | |
|     nesting_num_olss_minus1 | ue(v) |
|     for( i = 0; i <= nesting_num_olss_minus1; i++ ) | |
|       nesting_ols_idx_delta_minus1[ i ] | ue(v) |
|   } else { | |
|     nesting_all_layers_flag | u(1) |
|     if( !nesting_all_layers_flag ) { | |
|       nesting_num_layers_minus1 | ue(v) |
|       for( i = 1; i <= nesting_num_layers_minus1; i++ ) | |
|         nesting_layer_id[ i ] | u(6) |
|     } | |
|   } | |
|   nesting_num_seis_minus1 | ue(v) |
|   while( !byte_aligned( ) ) | |

-continued

| | Descriptor |
|---|---|
| nesting_zero_bit /* equal to 0 */ | u(1) |
| for( i = 0; i <= nesting_num_seis_minus1; i++ ) | |
| sei_message( ) | |
| } | |

General SEI payload semantics are provided.

The following applies on the applicable layers or OLS of non-scalable-nested SEI messages.

For a non-scalable-nested SEI message, when payloadType is equal to 0 (buffering period), 1 (picture timing), or 130 (decoding unit information), the non-scalable-nested SEI message applies only to the 0-th OLS.

For a non-scalable-nested SEI message, when payloadType is equal to any value among VclAssociatedSeiList, the non-scalable-nested SEI message applies only to the layer for which the VCL NAL units have nuh_layer_id equal to the nuh_layer_id of the SEI NAL unit containing the SEI message.

It is a requirement of bitstream conformance that the following restrictions apply on the value of nuh_layer_id of SEI NAL units:

When a non-scalable-nested SEI message has payloadType equal to 0 (buffering period), 1 (picture timing), or 130 (decoding unit information), the SEI NAL unit containing the non-scalable-nested SEI message shall have nuh_layer_id equal to vps_layer_id[0].

When a non-scalable-nested SEI message has payloadType equal to any value among VclAssociatedSeiList, the SEI NAL unit containing the non-scalable-nested SEI message shall have nuh_layer_id equal to the value of nuh_layer_id of the VCL NAL unit associated with the SEI NAL unit.

An SEI NAL unit containing a scalable nesting SEI message shall have nuh_layer_id equal to the lowest value of nuh_layer_id of all layers to which the scalable-nested SEI message apply (when nesting_ols_flag of the scalable nesting SEI message is equal to 0) or the lowest value of nuh_layer_id of all layers in the OLSs to which the scalable-nested SEI message apply (when nesting_ols_flag of the scalable nesting SEI message is equal to 1).

When a scalable nesting SEI message contains a buffering period, picture timing, or decoding unit information SEI message, the scalable nesting SEI message shall not contain any other SEI message with payloadType not equal to 0 (buffering period), 1 (picture timing), or 130 (decoding unit information).

It is a requirement of bitstream conformance that the following restrictions apply on the value of the nal_unit_type of the SEI NAL unit containing a scalable nesting SEI message:

When a scalable nesting SEI message contains an SEI message that has payloadType equal to 0 (buffering period), 1 (picture timing), 130 (decoding unit information), 145 (dependent RAP indication), or 168 (frame-field information), the SEI NAL unit containing the scalable nesting SEI message shall have nal_unit_type equal to PREFIX_SEI_NUT.

nesting_ols_flag equal to 1 specifies that the scalable-nested SEI messages apply to specific OLSs. nesting_ols_flag equal to 0 specifies that the scalable-nested SEI messages apply to specific layers.

It is a requirement of bitstream conformance that the following restrictions apply on the value of nesting_ols_flag:

When the scalable nesting SEI message contains an SEI message that has payloadType equal to 0 (buffering period), 1 (picture timing), or 130 (decoding unit information), the value of nesting_ols_flag shall be equal to 1.

When the scalable nesting SEI message contains an SEI message that has payloadType equal to a value in VclAssociatedSeiList, the value of nesting_ols_flag shall be equal to 0.

nesting_num_olss_minus1 plus 1 specifies the number of OLSs to which the scalable-nested SEI messages apply. The value of nesting_num_olss_minus1 shall be in the range of 0 to TotalNumOlss−1, inclusive.

nesting_ols_idx_delta_minus1[i] is used to derive the variable NestingOlsIdx[i] that specifies the OLS index of the i-th OLS to which the scalable-nested SEI messages apply when nesting_ols_flag is equal to 1. The value of nesting_ols_idx_delta_minus1[i] shall be in the range of 0 to TotalNumOls−2, inclusive, inclusive.

The variable NestingOlsIdx[i] is derived as follows.

```
if( i = = 0 )
  NestingOlsIdx[ i ] = nesting_ols_idx_delta_minus1[ i ]
else
  NestingOlsIdx[ i ] = NestingOlsIdx[ i − 1 ] + nesting_ols_idx_delta_minus1[ i ] + 1
```

The scalable nesting SEI message semantics are provided.

The scalable nesting SEI message provides a mechanism to associate SEI messages with specific OLSs or with specific layers.

A scalable nesting SEI message contains one or more SEI messages. The SEI messages contained in the scalable nesting SEI message are also referred to as the scalable-nested SEI messages.

It is a requirement of bitstream conformance that the following restrictions apply on containing of SEI messages in a scalable nesting SEI message:

An SEI message that has payloadType equal to 132 (decoded picture hash) or 133 (scalable nesting) shall not be contained in a scalable nesting SEI message.

nesting_all_layers_flag equal to 1 specifies that the scalable-nested SEI messages apply to all layers that have nuh_layer_id greater than or equal to the nuh_layer_id of the current SEI NAL unit. nesting_all_layers_flag equal to 0 specifies that the scalable-nested SEI messages may or may not apply to all layers that have nuh_layer_id greater than or equal to the nuh_layer_id of the current SEI NAL unit.

nesting_num_layers_minus1 plus 1 specifies the number of layers to which the scalable-nested SEI messages apply. The value of nesting_num_layers_minus1 shall be in the range of 0 to vps_max_layers_minus1−GeneralLayerIdx[nuh_layer_id], inclusive, where nuh_layer_id is the nuh_layer_id of the current SEI NAL unit.

nesting_layer_id[i] specifies the nuh_layer_id value of the i-th layer to which the scalable-nested SEI messages apply when nesting_all_layers_flag is equal to 0. The value of nesting_layer_id[i] shall be greater than nuh_layer_id, where nuh_layer_id is the nuh_layer_id of the current SEI NAL unit.

When nesting_ols_flag is equal to 0, the variable NestingNumLayers, specifying the number of layer to which the scalable-nested SEI messages apply, and the list NestingLayerId[i] for i in the range of 0 to NestingNumLayers−1, inclusive, specifying the list of nuh_layer_id value of the layers to which the scalable-nested SEI messages apply, are derived as follows, where nuh_layer_id is the nuh_layer_id of the current SEI NAL unit.

```
if( nesting_all_layers_flag ) {
  NestingNumLayers =
ps_max_layers_minus1 + 1 − GeneralLayerIdx[ nuh_layer_id ]
  for( i = 0; i < NestingNumLayers; i ++)
    NestingLayerId[ i ] = vps_layer_id[ GeneralLayerIdx[ nuh_layer_id ] + i ]
} else {
  NestingNumLayers = nesting_num_layers_minus1 + 1
  for( i = 0; i < NestingNumLayers; i ++)
    NestingLayerId[ i ] = ( i = = 0 ) ? nuh_layer_id : nesting_layer_id[ i ]
}
```

nesting_num_seis_minus1 plus 1 specifies the number of scalable-nested SEI messages. The value of nesting_num_seis_minus1 shall be in the range of 0 to 63, inclusive.

nesting_zero_bit shall be equal to 0.

Figure 10:
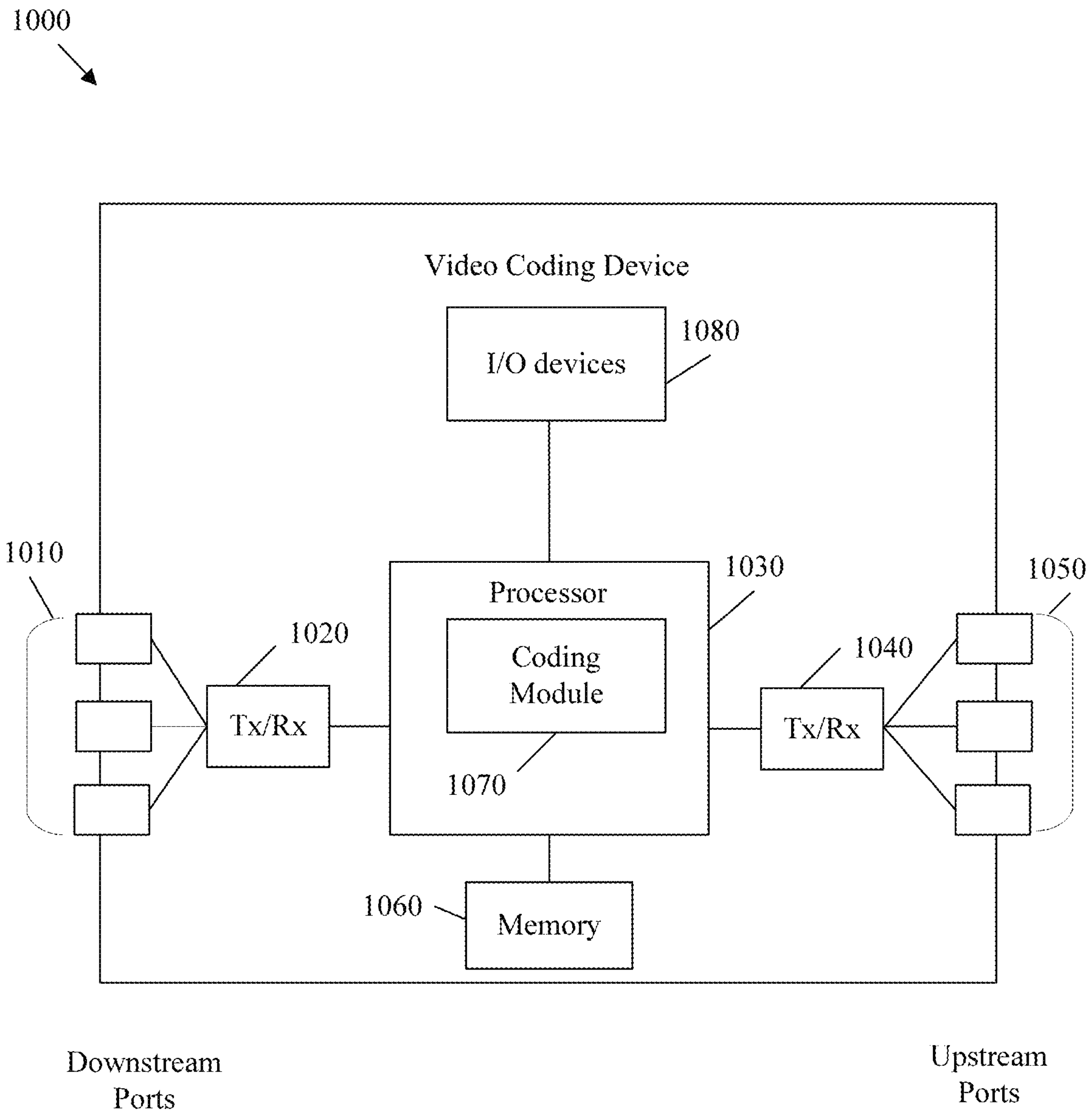
FIG. 10 is a schematic diagram of a video coding device.

FIG. 10 is a schematic diagram of a video coding device 1000 (e.g., a video encoder 300 or a video decoder 400) according to an embodiment of the disclosure. The video coding device 1000 is suitable for implementing the disclosed embodiments as described herein. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various codec functions. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an overflow data storage device, to store programs when such programs are selected for execution, and to store instructions and data that are read during program execution. The memory 1060 may be volatile and/or non-volatile and may be read-only memory (ROM), random access memory (RAM), ternary content-addressable memory (TCAM), and/or static random-access memory (SRAM).

Figure 11:
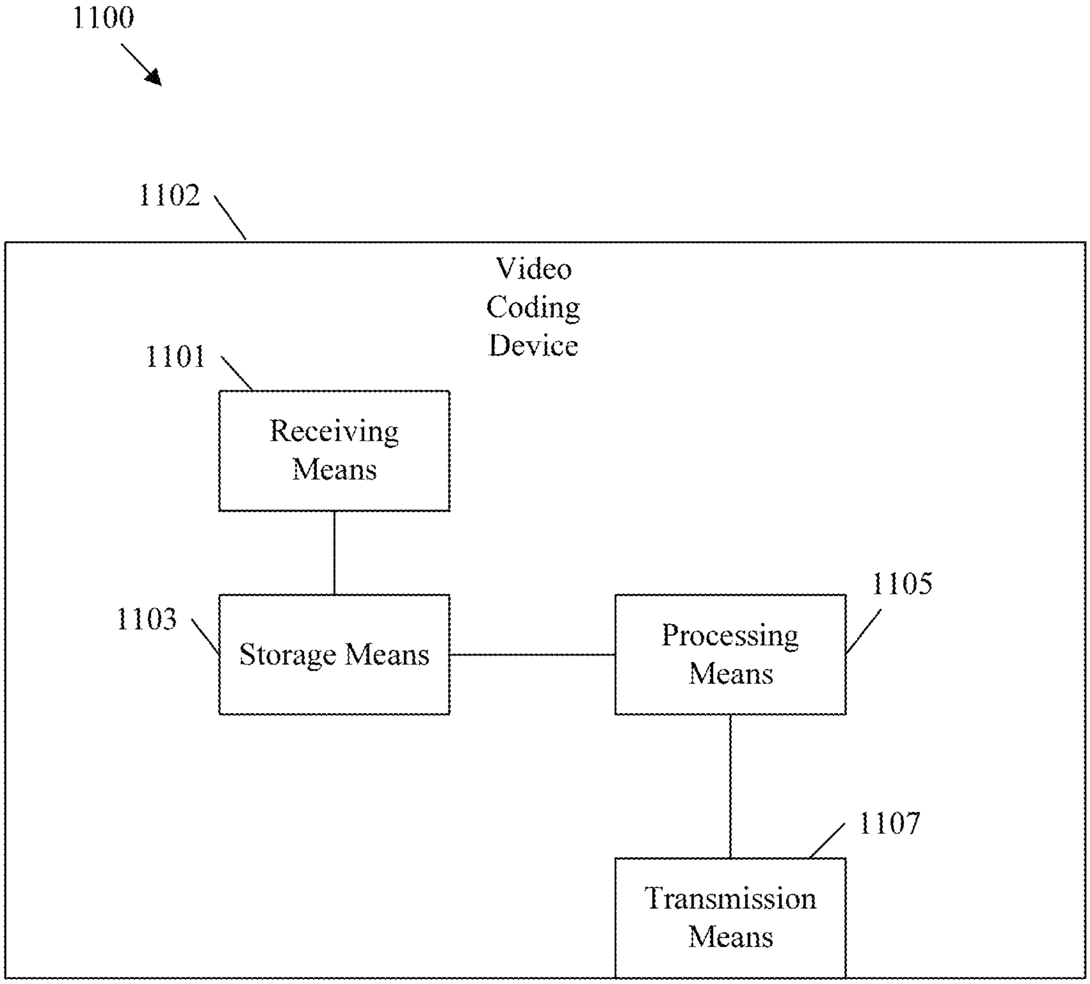
FIG. 11 is a schematic diagram of an embodiment of a means for coding.

FIG. 11 is a schematic diagram of an embodiment of a means for coding 1100. In an embodiment, the means for coding 1100 is implemented in a video coding device 1102 (e.g., a video encoder 300 or a video decoder 400). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions. The video coding device 1102 also includes processing means 1105. The processing means 1105 is coupled to the storage means 1103. The processing means 1105 is configured to execute the instructions stored in the storage means 1103 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of encoding, comprising:

generating a video parameter set (VPS) and a sequence parameter set (SPS), wherein the VPS includes a list of profile tier level (PTL) syntax structures, wherein the list of PTL syntax structures comprises a first PTL syntax structure for a first output layer set (OLS), wherein the first OLS has only one layer, wherein the SPS is referred to by the only one layer and includes a second PTL syntax structure for the first OLS, and wherein the first PTL syntax structure and the second PTL syntax structure are identical; and encoding the VPS and the SPS into a bitstream.

2. The method of claim 1, wherein the only one layer is a lowest layer among layers that refer to the SPS, and wherein the lowest layer is an independent layer.

3. The method of claim 1, wherein the list of PTL syntax structures is applied to one or more OLSs specified by the VPS.

4. The method of claim 1, wherein the VPS includes an index to the list of PTL syntax structures.

5. The method of claim 4, wherein the index is in a range of zero to a value, wherein the value plus 1 specifies a total number of the PTL syntax structures in the VPS.

6. The method of claim 5, wherein the value is that of a syntax element in the VPS, and wherein the syntax element is designated vps_num_ptls_minus1.

7. The method of claim 1, further comprising extracting a sub-bitstream from the bitstream, wherein the sub-bitstream includes the SPS but does not include the VPS.

8. The method of claim 7, further comprising transmitting the sub-bitstream toward a video decoder or storing the sub-bitstream.

9. The method of claim 1, further comprising storing the bitstream.

10. A method of decoding, comprising:

receiving a bitstream comprising a video parameter set (VPS) and a sequence parameter set (SPS), wherein the VPS includes a list of profile tier level (PTL) syntax structures, wherein the list of PTL syntax structures comprises a first PTL syntax structure for a first output layer set (OLS), wherein the first OLS has only one layer, wherein the SPS is referred to by the only one layer and includes a second PTL syntax structure for the first OLS, and wherein the first PTL syntax structure and the second PTL syntax structure are identical; and decoding the VPS and the SPS from the bitstream.

11. The method of claim 10, wherein the only one layer is a lowest layer among layers that refer to the SPS, and wherein the lowest layer is an independent layer.

12. The method of claim 10, wherein the list of PTL syntax structures is applied to one or more OLSs specified by the VPS.

13. The method of claim 10, wherein the VPS includes an index to the list of PTL syntax structures.

14. The method of claim 13, wherein the index is in a range of zero to a value, wherein the value plus 1 specifies a total number of the PTL syntax structures in the VPS.

15. The method of claim 14, wherein the value is that of a syntax element in the VPS, and wherein the syntax element is designated vps_num_ptls_minus1.

16. The method of claim 10, further comprising extracting a sub-bitstream from the bitstream, wherein the sub-bitstream includes the SPS but does not include the VPS.

17. A non-transitory computer-readable medium storing an encoded bitstream and one or more instructions that, when executed by at least one processor, cause a decoding device to generate a video based on the encoded bitstream, the encoded bitstream comprising:

a video parameter set (VPS) and a sequence parameter set (SPS), wherein the VPS includes a list of profile tier level (PTL) syntax structures, wherein the list of PTL syntax structures comprises a first PTL syntax structure for a first output layer set (OLS), wherein the first OLS has only one layer, wherein the SPS is referred to by the only one layer and includes a second PTL syntax structure for the first OLS, and wherein the first PTL syntax structure and the second PTL syntax structure are identical.

18. The non-transitory computer-readable medium of claim 17, wherein the only one layer is a lowest layer among layers that refer to the SPS, and wherein the lowest layer is an independent layer.

19. The non-transitory computer-readable medium of claim 17, wherein the list of PTL syntax structures is applied to one or more OLSs specified by the VPS.

20. The non-transitory computer-readable medium of claim 17, wherein the VPS includes an index to the list of PTL syntax structures, wherein the index is in a range of zero to a value, wherein the value plus 1 specifies a total number of the PTL syntax structures in the VPS, and wherein the value is that of a syntax element in the VPS, and wherein the syntax element is designated vps_num_ptls_minus1.

* * * * *